(12) United States Patent
Nakano et al.

(10) Patent No.: US 8,637,207 B2
(45) Date of Patent: Jan. 28, 2014

(54) LIQUID FUEL, FUEL CARTRIDGE AND FUEL CELL

(75) Inventors: Yoshihiko Nakano, Yokohama (JP);
Kazuhiro Yasuda, Yokohama (JP);
Hideyuki Oozu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 690 days.

(21) Appl. No.: 11/513,069

(22) Filed: Aug. 31, 2006

(65) Prior Publication Data

US 2006/0286427 A1     Dec. 21, 2006

Related U.S. Application Data

(63) Continuation of application No. PCT/JP2006/309607, filed on May 8, 2006.

(30) Foreign Application Priority Data

| May 9, 2005 | (JP) | 2005-136349 |
| May 9, 2005 | (JP) | 2005-136350 |
| May 9, 2005 | (JP) | 2005-136402 |

(51) Int. Cl.
*H01M 8/22* (2006.01)
*B65D 6/40* (2006.01)

(52) U.S. Cl.
USPC .......................... 429/502; 429/506; 220/601

(58) Field of Classification Search
USPC ........... 429/21, 30, 34, 12, 38, 408, 410, 421, 429/427–429, 443, 447–449, 452, 462, 456, 429/544–545, 512–516, 535; 220/601; 524/210; 137/88, 93; 96/108–111, 147, 96/154

See application file for complete search history.

(56) References Cited

U.S. PATENT DOCUMENTS

| 6,492,047 | B1 | 12/2002 | Peled et al. |
| 2002/0098402 | A1 | 7/2002 | Fan et al. |
| 2005/0058880 | A1* | 3/2005 | Fujita et al. ................ 429/38 |
| 2005/0095468 | A1* | 5/2005 | Mori ........................... 429/12 |
| 2005/0255348 | A1 | 11/2005 | Manako et al. |
| 2005/0271930 | A1* | 12/2005 | Egawa ......................... 429/42 |
| 2006/0030652 | A1* | 2/2006 | Adams et al. .............. 524/210 |
| 2006/0174941 | A1* | 8/2006 | Cohen et al. ................ 137/93 |
| 2006/0222914 | A1 | 10/2006 | Yasuda et al. |

FOREIGN PATENT DOCUMENTS

| JP | 2001-93558 | 4/2001 |
| JP | 2004-6335 | 1/2004 |
| JP | 2004079210 A  * | 3/2004 ............. H01M 8/06 |
| JP | 2005-5155 | 1/2005 |
| JP | 2005-38803 | 2/2005 |

(Continued)

OTHER PUBLICATIONS

Machine Translation and Abstract in English of JP2004079210.*

(Continued)

*Primary Examiner* — Barbara Gilliam
*Assistant Examiner* — Claire L Roe
(74) *Attorney, Agent, or Firm* — Oblon, Spivak, McClelland, Maier & Neustadt, L.L.P.

(57) ABSTRACT

A fuel cartridge includes a container having an outlet port section, and a liquid fuel provided in the container. The liquid fuel contains a cationic impurity excluding $H^+$. The concentration of the cationic impurity falls within a range of $1 \times 10^{-7}$ to $6 \times 10^{-6}$ equivalent/L at the outlet port section.

21 Claims, 4 Drawing Sheets

(56) References Cited

FOREIGN PATENT DOCUMENTS

| | | |
|---|---|---|
| JP | 2005-539363 | 12/2005 |
| WO | WO 03/105263 A2 | 12/2003 |
| WO | WO 2004/004050 A1 | 1/2004 |
| WO | WO 2004/027893 | 4/2004 |
| WO | WO 2004/102717 A1 | 11/2004 |
| WO | WO 2005/004268 | 1/2005 |

OTHER PUBLICATIONS

B. K. Deshmukh, et al., "Characterization of Reactive Impurities in Methanol, Ethanol, and 2-Propanol by Monitoring the Activities of Added Ionic Probes with Ion Selective Electrodes", Analytical Chemistry, vol. 56, No. 13, Nov. 1984, 1 cover page and pp. 2373-2378.

U.S. Appl. No. 11/513,069, filed Aug. 31, 2006, Nakano et al.

* cited by examiner

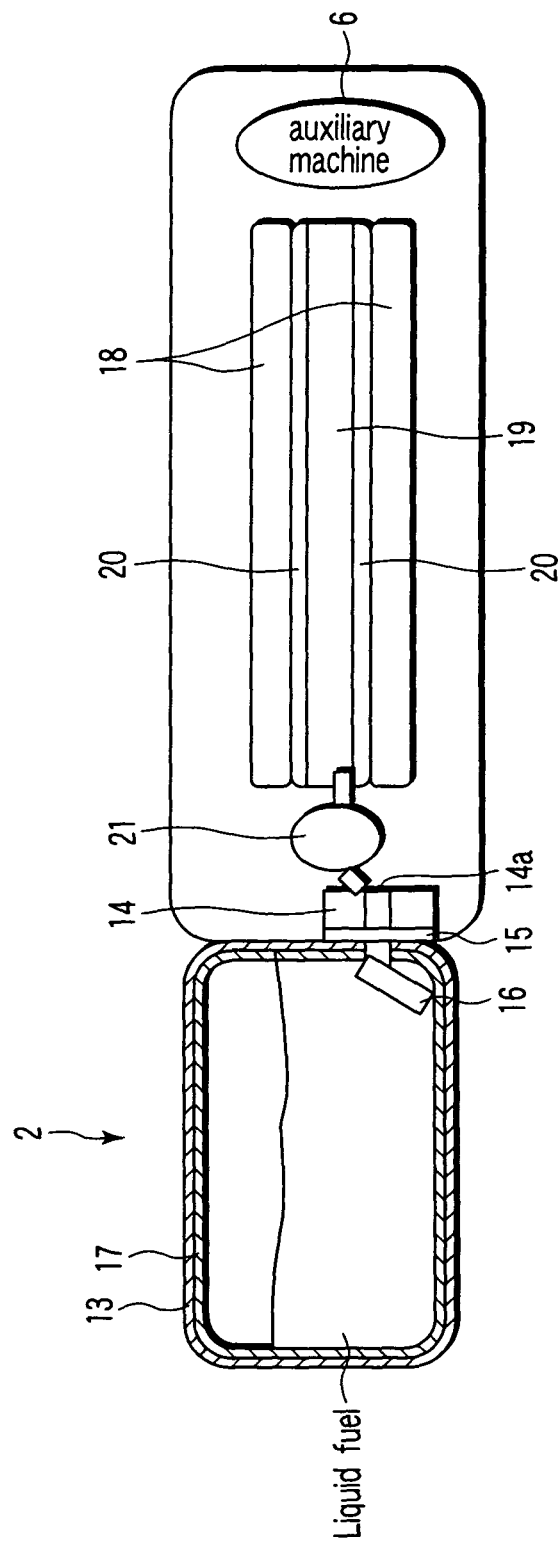
F I G. 3

LIQUID FUEL, FUEL CARTRIDGE AND FUEL CELL

CROSS-REFERENCE TO RELATED APPLICATIONS

This is a Continuation Application of PCT Application No. PCT/JP2006/309607, filed May 8, 2006, which was published under PCT Article 21(2) in English.

This application is based upon and claims the benefit of priority from prior Japanese Patent Applications No. 2005-136349, filed May 9, 2005; No. 2005-136350, filed May 9, 2005; and No. 2005-136402, filed May 9, 2005, the entire contents of all of which are incorporated herein by reference.

BACKGROUND OF THE INVENTION

1. Field of the Invention

The present invention relates to a liquid fuel and a fuel cartridge adapted for a fuel cell and also relates to a fuel cell.

2. Description of the Related Art

In a fuel cell, fuels such as hydrogen and methanol are electrochemically oxidized within a cell so as to convert the chemical energy of the fuels directly into an electric energy so as to take out the electric energy. Therefore, the fuel cell is free from the generation of the air pollutants such as $NO_x$ and $SO_x$, which are caused by the combustion of the fuels in a thermoelectric power plant, and, thus, attracts attention as a supply source of a clean electric energy.

Particularly, the direct liquid fuel cell is said to be capable of miniaturization and, thus, vigorous research is being carried out on such fuel cells in an attempt to develop a portable fuel cell. Various types of direct liquid fuel cell are known to the art, including a fuel cell of the liquid fuel supply type utilizing capillary force or channel plate. An alcohol, formic acid or an aqueous solution thereof is used as the liquid fuel of the fuel cell. On the other hand, in the portable fuel cell, how to supply the fuel to the fuel cell is an important factor for achieving continuous power generation. As one of the fuel supply methods, it is known to the art to design the fuel cell to include a fuel cell body and a fuel cartridge that can be connected to the fuel cell body. In this case, the fuel cell can perform continuous power generation by replacing the fuel cartridge.

In order to enable the fuel cell described above to perform continuous power generation, it is crucial to use the fuel cartridge. On the other hand, in the direct liquid fuel cell, the fuel is supplied directly to the power generation element, i.e., the membrane electrode assembly (MEA), giving rise to the defect that the direct liquid fuel cell tends to be highly affected by the impurities contained in the fuel. The fuel itself is synthesized and prepared by various methods, with the result that it is possible for many impurities to be contained in the fuel. Also, it is preferable for the fuel used in the fuel cartridge to have a high concentration in order to increase the volume energy density of the fuel. However, if the fuel concentration is increased, the impurities tend to enter the fuel more easily.

Each of Jpn. Pat. Appln. KOKAI NO. 2005-5155 and Jpn. Pat. Appln. KOKAI NO. 2005-38803 relates to a fuel container for a fuel cell, comprising a container body having a hermetic structure and a valve mechanism for controlling the supply of the fuel from within the container body. It is disclosed in each of these patent documents that the constituting members of the fuel container that are in contact with the fuel are formed of a nonmetallic material so as to avoid elution of metal ions into the fuel housed in the fuel container.

Also, Jpn. Pat. Appln. KOKAI NO. 2001-93558 relates to a direct alcohol fuel cell, particularly, to a fuel permeation evaporation type fuel cell. It is reported in this patent document that a surfactant is added to the fuel in order to improve the permeability of the fuel and, that a discriminating agent, i.e., an organic material having a color or a odor, is also added to the fuel in view of the safety. However, in the fuel cell reported in this patent document, the fuel can permeate into a porous body by utilizing the capillary phenomenon so as to be evaporated. Such being the situation, it is impossible for the additives noted above to be evaporated and accumulated in the MEA.

Further, Jpn. Pat. Appln. KOKAI NO. 2001-93558 quoted above teaches that a surfactant, a coloring dye, a low-freezing liquefying agent, etc. are added to the fuel for the fuel cell.

BRIEF SUMMARY OF THE INVENTION

According to a first aspect of the present invention, there is provided a fuel cartridge, comprising:

a container having an outlet port section; and a liquid fuel provided in the container and containing a fuel component and a cationic impurity excluding $H^+$, and a concentration of the cationic impurity falling within a range of $1 \times 10^{-7}$ to $6 \times 10^{-6}$ equivalent/L at the outlet port section.

According to a second aspect of the present invention, there is provided a fuel cell, comprising:

a fuel cartridge including a container having an outlet port section and a liquid fuel provided in the container and containing a fuel component and a cationic impurity excluding $H^+$, and a concentration of the cationic impurity falling within a range of $1 \times 10^{-7}$ to $6 \times 10^{-6}$ equivalent/L at the outlet port section; and a membrane electrode assembly to which is supplied the liquid fuel through the outlet port section of the fuel cartridge.

According to a third aspect of the present invention, there is provided a liquid fuel, comprising:

a fuel component; and a cationic impurity excluding $H^+$, in a concentration of $1 \times 10^{-7}$ to $6 \times 10^{-6}$ equivalent/L.

According to a fourth aspect of the present invention, there is provided a fuel cartridge, comprising:

a container having an outlet port section; and a liquid fuel provided in the container and containing an organic fuel component and an organic impurity, and a concentration of the organic impurity falling within a range of 0.1 to 20 ppm at the outlet port section.

According to a fifth aspect of the present invention, there is provided a fuel cell, comprising:

a fuel cartridge including a container having an outlet port section and a liquid fuel provided in the container and containing an organic fuel component and an organic impurity, and a concentration of the organic impurity falling within a range of 0.1 to 20 ppm at the outlet port section; and a membrane electrode assembly to which is supplied the liquid fuel through the outlet port section of the fuel cartridge.

According to a sixth aspect of the present invention, there is provided a liquid fuel, comprising:

an organic fuel component; and 0.1 to 20 ppm of an organic impurity.

According to a seventh aspect of the present invention, there is provided a fuel cartridge, comprising:

a fuel container section; and a liquid fuel provided in the fuel container section and containing an organic fuel component and a solid component which is precipitated when the liquid fuel is subjected to an evaporation drying, and a concentration of the solid component falling within a range of 0.01 to 30 µg/cc.

Further, according to an eighth aspect of the present invention, there is provided a fuel cell, comprising:

a fuel cartridge including a fuel container section and a liquid fuel provided in the fuel container section and containing an organic fuel component and a solid component which is precipitated when the liquid fuel is subjected to an evaporation drying, and a concentration of the solid component falling within a range of 0.01 to 30 µg/cc; and a membrane electrode assembly to which is connected to the fuel cartridge.

BRIEF DESCRIPTION OF THE SEVERAL VIEWS OF THE DRAWING

FIG. 3 schematically shows another construction of a fuel cell according to the seventh embodiment;

DETAILED DESCRIPTION OF THE INVENTION

First Embodiment

Figure 1:
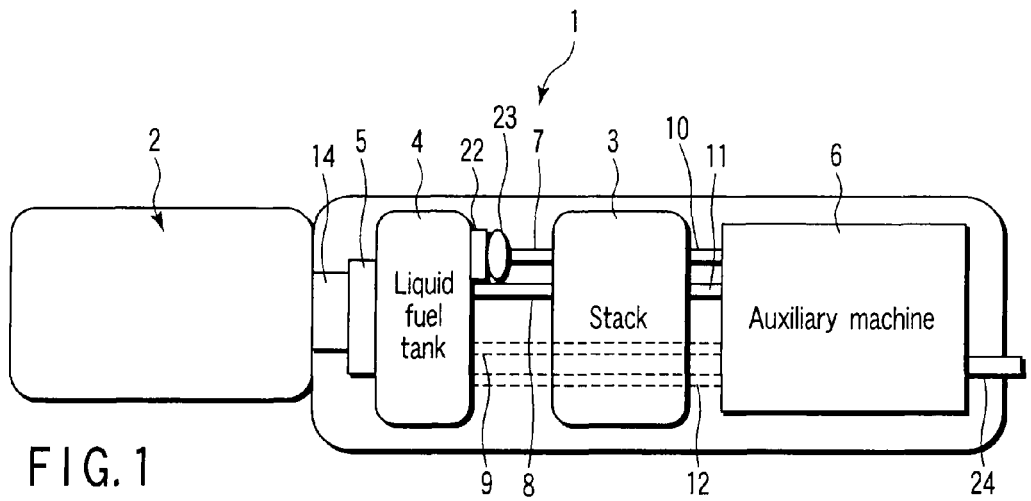
FIG. 1 schematically exemplifies the construction of a fuel cell according to a seventh embodiment.

The liquid fuel for the fuel cell according to a first embodiment of the present invention comprises a fuel component and a cationic impurity excluding $H^+$. The concentration of the cationic impurity contained in the liquid fuel falls within a range of $1 \times 10^{-7}$ equivalent/L to $6 \times 10^{-6}$ equivalent/L.

The fuel component includes, for example, a compound having in the molecule at least one functional group selected from the group consisting of an alcoholic hydroxyl group and an aldehyde group, and an aqueous solution of the particular compound.

The embodiment of present invention has been achieved in the course of vigorous research on the effects of cationic impurities on the cell performance of a liquid fuel cell. The cationic impurities are accumulated in the membrane electrode assembly (MEA) forming the main portion of the fuel cell so as to deteriorate the electrolyte and the catalyst contained in the catalyst layer, electrolyte membrane, etc., thereby bringing about the problem that the performance of the fuel cell is lowered and deteriorated with increase in the operating time (accumulated operating time) of the fuel cell. The present inventors have found that the fuel cell performance is rapidly deteriorated when the amount of the cationic impurities accumulated in the MEA exceeds about 10% of the ion exchange capacity of the electrolyte contained in the electrolyte membrane and the electrode. In order to protect the MEA from the degradation of the performance caused by the cationic impurities, it is desirable for the concentration of the cationic impurities at the outlet port section of the fuel cartridge to be not higher than $6 \times 10^{-6}$ equivalent/L (normality). If the fuel cell is operated under the condition that the concentration of the cationic impurities exceeds $6 \times 10^{-6}$ equivalent/L (normality) at the outlet port section of the fuel cartridge, the resistance of the electrolyte is increased so as to prevent the catalytic reaction. Therefore, the performance of the fuel cell is markedly lowered and deteriorated, with the result that it is impossible to maintain a good performance of the fuel cell for a long time.

Since the cationic impurities are accumulated in the MEA even if the concentration of the cationic impurities is low, it is desirable for the cationic impurities not to be present at all. However, the present inventors have discovered that the cationic impurities produce the effect of suppressing the fuel permeation into the cathode (particularly, methanol crossover) and have also found that it is possible to improve the operating performance of the fuel cell for a long time and to suppress the fuel permeation into the cathode if the concentration of the cationic impurities falls within a range of $1 \times 10^{-7}$ equivalent/L (normality) to $6 \times 10^{-6}$ equivalent/L (normality). It is more desirable for the concentration of the cationic impurities at the liquid fuel outlet section of the fuel cartridge to fall within a range of $4 \times 10^{-7}$ equivalent/L (normality) to $3 \times 10^{-6}$ equivalent/L (normality).

The cationic impurities noted above include, for example, an alkali metal ion, alkaline earth metal ion, a transition metal ion, a group III metal ion, a group IV metal ion, a sulfonium ion, and an ammonium ion. It is possible for a single kind of cation and a plurality of different kinds of cations to be contained in the liquid fuel. Particularly, in view of the aspect of enhancing the effect of suppressing the fuel permeation into the cathode, it is desirable for the liquid fuel to contain at least one kind of cation selected from the group consisting of a Na ion, a K ion, a Ca ion, an Fe ion, a Ni ion, a Cr ion, a Mn ion, a Cu ion, a Zn ion, a Co ion, a Mg ion, a Sn ion, a Pb ion, an Al ion and an ammonium ion.

Second Embodiment

The fuel cartridge for a fuel cell according to a second embodiment of the present invention comprises a container having an outlet port section and a liquid fuel housed in the container. The liquid fuel contains a fuel component and a cationic impurity excluding $H^+$. The concentration of the cationic impurity contained in the liquid fuel falls within a range of $1 \times 10^{-7}$ equivalent/L to $6 \times 10^{-6}$ equivalent/L at the outlet port section of the container.

In the fuel cartridge for the fuel cell, it is possible to arrange a cation absorbent in that portion of the container or the outlet port section of the container which is in contact with the liquid fuel. The cation adsorbent includes, for example, at least one kind of material selected from the group consisting of a cation exchange resin and a cation exchange ceramic material.

Also, it is possible to form a layer for suppressing the fuel permeation into the cartridge at the interface portion of the container that is in contact with the liquid fuel.

It is possible for the fuel cartridge to be detachable from a stack (a fuel cell electromotive section) such that the fuel cartridge can be replaced, or to be fixed to the stack such that the fuel cartridge can replenished with the liquid fuel. In order to enable the concentration of the total cationic impurities to fall within a rage of $1 \times 10^{-7}$ equivalent/L (normality) to $6 \times 10^{-6}$ equivalent/L (normality) at the outlet port section of the container, it is conceivable to use a liquid fuel containing the total cationic impurities in a concentration falling within the range given above. The total amount of the cationic impurities contained in the liquid fuel can be controlled to have a concentration falling within the range given above by refining the liquid fuel with, for example, an ion exchange resin.

It is desirable to set in advance the concentration of the cationic impurities contained in the liquid fuel to fall within the range given above and to form the container of the fuel cartridge by using a polymer or a metal that is not dissolved in the fuel.

The polymer satisfying the requirement given above includes, for example, polyethylene, polypropylene, Teflon (registered trademark), PFA, polycarbonate, polyether ether ketone (PEEK), polysulfone, polystyrene, polymethyl pentene and an epoxy resin.

On the other hand, the metal satisfying the requirement given above includes, for example, stainless steel, molybdenum and titanium. The metal that may possibly be dissolved gradually in the liquid fuel can also be used for forming the container of the fuel cartridge, if a metal container protective layer (barrier layer) that is not dissolved in the liquid fuel is formed on the inner surface of the container. It is possible to use, for example, a noble metal, an oxide, a polymer or a diamond-like carbon (DLC) for forming the metal container protective layer, though the material of the metal container protective layer is not particularly limited thereto. Incidentally, the oxide used for forming the metal container protective layer includes an oxide of at least one kind of element selected from the group consisting of Ti, Si and Zr.

When it comes to the polymer noted above, it is possible for the synthetic catalyst, the additive, etc. contained in the polymer to elute into the liquid fuel. Also, since the cationic impurity is formed within the metal container by the reaction between the fuel and, for example, the dissolved oxygen, it is desirable to form a protective layer consisting of, for example, a polymer on the inner surface of the metal container. The protective layer can be formed by, for example, the sputtering method, the CVD method or the coating method.

In order to prevent the elution of the ionic component from the protective layer and the polymer forming the container, it is desirable to form a barrier layer effective for suppressing the permeation of the liquid fuel in at least the interface section of the container that is in contact with the liquid fuel. The barrier layer can be formed by, for example, the sputtering method, the CVD method or the coating method. To be more specific, the barrier layer can be formed of oxides or a diamond-like carbon (DLC). The oxides includes a oxide of at least one element selected from the group consisting of Ti, Zr and Si, a composite oxide of at least one element selected from the group consisting of Ti, Zr and Si, and a composite oxide containing at least one kind of element selected from the group consisting of Ti, Zr and Si and at least one kind of another element selected from the group consisting of Mo, P and W.

If an adsorbent of the cationic impurities is housed in the fuel cartridge, it is possible to remove the cationic impurities by the function of the adsorbent even if the cationic impurities are eluted from the fuel cartridge into the liquid fuel so as to make it possible to maintain the total amount of the cationic impurities contained in the liquid fuel at the prescribed value at the outlet port section of the fuel cartridge. The adsorbent of the cationic impurities includes, for example, a cation exchange resin and a cation exchange ceramic material. It is possible to use a single kind of adsorbent or a plurality of different kinds of adsorbents in combination. When it comes to the cation exchange capability imparted to the fuel cartridge, it suffices for the ion exchange amount to be not smaller than the sum of the cationic impurities that are already contained in the fuel and the amount of the cationic impurities that are expected to elute from the fuel cartridge. It is more desirable for the ion exchange capability noted above to be at least 3 times as much as the total amount of the impurities. The adsorbent can be arranged anywhere, as long as the adsorbent is in contact with the liquid fuel. Also, the form of the adsorbent is not particularly limited. To be more specific, it is possible to arrange the adsorbent as a filter in the outlet port section of the fuel cartridge, to arrange the adsorbent as a granular material within the fuel cartridge, or to attach the adsorbent to the inner surface of the container of the fuel cartridge, though the manner of arranging the adsorbent is not particularly limited thereto. Any kind of polymer can be used as the cation exchange resin as far as the polymer has at least one functional group selected from the group consisting of a sulfonate group, a carboxyl group, a phosphate group and a phosphonate group and the polymer is insoluble in the liquid fuel. To be more specific, the cation exchange resin includes, for example, a sulfonated styrene-divinyl benzene copolymer resin, though the cation exchange resin is not limited thereto. On the other hand, it is advisable to use an insoluble salt of a hydrogen phosphate and/or a hydrogen sulfate as the cation exchange ceramic material. To be more specific, it is advisable to use zirconium hydrogen phosphate as the cation exchange ceramic material.

Incidentally, a liquid fuel having a cationic impurities concentration exceeding $6 \times 10^{-6}$ equivalent/L (normality) can be used, if the cationic impurities are removed within the fuel cartridge by using an adsorbent so as to allow the sum of the cationic impurities to fall within a range of $1 \times 10^{-7}$ equivalent/L (normality) to $6 \times 10^{-6}$ equivalent/L (normality) in the outlet port section.

Where the container of the fuel cartridge is formed of a polymer, it is desirable to arrange another protective layer in addition to the protective layer noted above in order to prevent the evaporation of the liquid fuel from the cartridge. The additional protective layer can be obtained by forming a thin film of a metal or DLC in that portion of the fuel cartridge in which the liquid fuel is stored and which is not in contact with the liquid fuel. The thin film noted above can be formed by the vapor deposition or the sputtering method. To be more specific, the additional protective layer can be provided by a thin film of aluminum or DLC, though the additional protective layer is not limited thereto.

It is desirable for the fuel component of the liquid fuel to be formed of a compound having in the molecule at least one functional group selected from the group consisting of an alcoholic hydroxyl group and an aldehyde group or to be formed of an aqueous solution of the compound noted above. The specific examples of the compound noted above include, for example, methanol, ethanol, 2-propanol and formic acid, though the compound providing the fuel component is not limited thereto. It is desirable for the fuel component to contain 30 to 100% by weight, preferably 60 to 100% by weight, of the particular compound. Where the amount of the particular compound contained in the fuel component is smaller than 30% by weight, the fuel tank is rendered excessively large so as to make it difficult to miniaturize the fuel cell. The amount of another component of the liquid fuel such as water can be determined appropriately in accordance with the amount of the particular compound contained in the liquid fuel.

Third Embodiment

The liquid fuel for a fuel cell according to a third embodiment of the present invention comprises an organic fuel component and 0.1 to 20 ppm of organic impurities.

It is possible to use methanol and/or formic acid as the organic fuel component. On the other hand, the organic impurities contained in the liquid fuel include organic materials excluding methanol, formic acid, methyl formate, dimethyl ether, formaldehyde, methyl orthoformate and dimethoxymethane.

The embodiment of the present invention has been achieved in the course of extensive research on the effects of organic impurities on the cell performance in the liquid fuel cell. The organic fuel component of the liquid fuel includes an organic material such as methanol, formic acid and a mixture thereof, though the organic material noted above is not particularly limited thereto. The organic fuel component can consist of the organic material alone. It is also possible for the aqueous solution of the organic material noted above to be used as the organic fuel component. It is desirable for the organic fuel component to contain 30 to 100% by weight, preferably 60 to 99.5% by weight, of the organic material. Where the amount of the organic material contained in the organic fuel component is smaller than 30% by weight, the fuel tank is rendered excessively large so as to make it difficult to miniaturize the fuel cell. The amount of another component of the organic fuel components, such as water, can be determined appropriately in accordance with the amount of the organic material.

The organic impurities differ from the organic material included in the organic fuel component. Further, methyl formate, dimethyl ether, formaldehyde, dimethoxy methane and methyl orthoformate, which can be used as the fuel even if the amount thereof exceeds 20 ppm, are excluded from the organic impurities.

The organic impurities are accumulated in the membrane electrode assembly (MEA) constituting the main portion of the fuel cell so as to bring about an obstacle to the catalytic reaction and to increase the resistance of the electrolyte membrane. In addition, the triple phase boundaries bringing about the electrochemical reaction are collapsed so as to bring about the problem that the fuel cell performance is lowered and deteriorated with increase in the operating time of the fuel cell (accumulated operating time).

The present inventors have found that cell performance is rapidly deteriorated if the amount of the organic impurities contained in the liquid fuel exceeds 20 ppm in the outlet port section of the fuel cartridge. Such being the situation, in order to protect the membrane electrode assembly from the performance degradation caused by the organic impurities contained in the liquid fuel, it is desirable for the concentration (total amount) of the organic impurities contained in the liquid fuel to be not larger than 20 ppm in the outlet port section of the fuel cartridge. If the fuel cell is operated under the state that the concentration (total amount) of the organic impurities exceeds 20 ppm, the resistance of the electrolyte is increased so as to prevent the catalytic reaction. Therefore, the performance of the fuel cell is markedly lowered and deteriorated, with the result that it is impossible to maintain a good cell performance over a long time.

Since the cationic impurities are accumulated in the MEA even if the concentration of the cationic impurities is low, it is considered desirable for the cationic impurities not to be present at all. However, the present inventors have discovered that the cationic impurities produce the effect of suppressing the fuel permeation into the cathode (particularly, methanol cross-over) and have also found that it is possible to improve the operating performance of the fuel cell for a long time and to suppress the fuel permeation into the cathode if the concentration of the cationic impurities falls within a range of 0.1 ppm to 20 ppm. It is more desirable for the concentration of the sum of the cationic impurities at the outlet port section of the fuel cartridge to fall within a range of 0.5 ppm to 10 ppm.

Fourth Embodiment

The fuel cartridge for a fuel cell according to a fourth embodiment of the present invention comprises a container having an outlet port section and a liquid fuel housed in the container. The liquid fuel comprises an organic fuel component and organic impurities. The concentration of the organic impurities contained in the liquid fuel falls within a range of 0.1 to 20 ppm in the outlet port section of the fuel cartridge.

In the fuel cartridge for the fuel cell, it is possible to arrange an adsorbent or a filter of an organic impurities in that portion of the container which is in contact with the liquid fuel or in the outlet port section of the container.

Also, it is possible to form a layer effective for suppressing the permeation of the fuel into the cartridge in the interface section of the container that is in contact with the liquid fuel.

It is possible for the fuel cartridge to be detachable from the stack such that the fuel cartridge can be replaced, or to be fixed to the stack such that the fuel cartridge can replenished with the liquid fuel. In order to keep the concentration (total amount) of the cationic impurities within a range of 0.1 to 20 ppm at the outlet port section, it is conceivable to use a liquid fuel containing the cationic impurities in the concentration (total amount) falling within the range given above. The concentration (total amount) of the cationic impurities contained in the liquid fuel can be controlled to fall within the range given above by refining the liquid fuel by means of, for example, distillation.

It is desirable to set in advance the concentration of the cationic impurities contained in the liquid fuel to fall within the range given above and to form the container of the fuel cartridge by using a polymer or a metal that is not dissolved in the liquid fuel.

The polymer satisfying the requirement given above includes, for example, polyethylene, polypropylene, Teflon, PFA, polycarbonate, polyether ether ketone (PEEK), polysulfone, polystyrene, polymethyl pentene and an epoxy resin, though the polymer is not limited thereto.

On the other hand, the metal satisfying the requirement given above includes, for example, stainless steel, molybdenum and titanium, though the metal used for the particular purpose is not limited thereto. The metal that may possibly be dissolved gradually in the liquid fuel can also be used for forming the container of the fuel cartridge, if a metal container protective layer (barrier layer) that is not dissolved in the liquid fuel is formed on the inner surface of the container. It is possible to use, for example, a noble metal, an oxide, a polymer or a diamond-like carbon (DLC) for forming the metal container protective layer, though the material of the metal container protective layer is not particularly limited thereto. Incidentally, the oxide used for forming the metal container protective layer includes an oxide of at least one kind of the element selected from the group consisting of Ti, Si and Zr.

When it comes to the polymer noted above, it is possible for the synthetic catalyst, the additive, etc. contained in the polymer to elute into the liquid fuel. Such being the situation, it is desirable to form a protective layer on the inner surface of the container formed of the polymer. The protective layer can be formed by, for example, the sputtering method, the CVD method or the coating method.

In order to prevent the elution of the organic component from the protective layer and the polymer forming the container into liquid fuel, it is desirable to form a barrier layer effective for suppressing the permeation of the liquid fuel in at least the interface section of the protective layer and the container that is in contact with the liquid fuel. The barrier layer can be formed by, for example, the sputtering method, the CVD method or the coating method. To be more specific, the barrier layer is formed of oxides or a diamond-like carbon (DLC), though the material of the barrier layer is not particularly limited thereto. The oxides includes an oxide of at least one element selected from the group consisting of Ti, Zr and Si, a composite oxide of at least one element selected from the group consisting of Ti, Zr and Si, or a composite oxide containing at least one kind of element selected from the group consisting of Ti, Zr and Si and at least one kind of another element selected from the group consisting of Mo, P and W.

If an adsorbent of the organic impurities is housed in the fuel cartridge, it is possible to remove the organic impurities by the function of the adsorbent even if the organic impurities are eluted from the fuel cartridge into the liquid fuel. As a result, it is possible to maintain the total amount of the organic impurities at the prescribed value at the outlet port section of the fuel cartridge. The adsorbent of the organic impurities having a low polarity, includes, for example, activated charcoal and a resin having fine pores. Also, the adsorbent effective for removing the organic impurities containing nitrogen includes, for example, a cation exchange resin and a cation exchange ceramic material. When it comes to the cation exchange capability imparted to the fuel cartridge, it suffices for the adsorption amount to be not smaller than the sum of the organic impurities that are already contained in the fuel and the amount of the organic impurities that are expected to elute from the fuel cartridge. It is more desirable for the ion exchange capability noted above to be at least 3 times as much as the total amount of the impurities. The adsorbent can be arranged anywhere as far as the adsorbent is in contact with the liquid fuel. Also, the form of the adsorbent is not particularly limited. To be more specific, it is possible to arrange the adsorbent as a filter in the outlet port section of the fuel cartridge, to arrange the adsorbent as a granular material within the fuel cartridge, or to attach the adsorbent to the inner surface of the fuel cartridge, though the manner of arranging the adsorbent is not particularly limited thereto. The resin having fine pores noted above includes, for example, a styrene-divinyl benzene copolymer resin, though the resin is not limited to the copolymer resin noted above. Any kind of the polymer can be used as the cation exchange resin as far as the polymer has at least one functional group selected from the group consisting of a sulfonate group, a carboxyl group, a phosphate group and a phosphonate group and the polymer is insoluble in the liquid fuel. To be more specific, the cation exchange resin includes, for example, a sulfonated styrene-divinyl benzene copolymer resin, though the cation exchange resin is not limited thereto. On the other hand, it is advisable to use an insoluble salt of a hydrogen phosphate and/or a hydrogen sulfate as the cation exchange ceramic material. To be more specific, it is advisable to use zirconium hydrogen phosphate as the cation exchange ceramic material.

Incidentally, a liquid fuel containing the organic impurities in a concentration exceeding 20 ppm can be used, if the organic impurities are removed within the fuel cartridge by using an adsorbent so as to allow the concentration of the sum of the organic impurities to fall within a range of 0.1 to 20 ppm in the outlet port section.

Where the container of the fuel cartridge is formed of a polymer, it is desirable to arrange another protective layer in addition to the protective layer noted above in order to prevent the evaporation of the liquid fuel from the cartridge. The additional protective layer can be obtained by forming a thin film of a metal or DLC in that portion of the fuel cartridge in which the liquid fuel is stored and which is not in contact with the liquid fuel. The thin film noted above can be formed by the vapor deposition or the sputtering method. To be more specific, the additional protective layer can be provided by a thin film of aluminum or DLC, though the additional protective layer is not limited to the aluminum thin film and the DLC thin film.

On the other hand, it is possible to arrange a filter and an adsorbent in the outlet port section of the fuel cartridge in order to remove by adsorption and filtration the discriminating agent (i.e., an organic material having a color and a smell) that is mixed for securing the safety. The adsorbent used includes, for example, an activated charcoal, an ion exchange resin and a resin having fine pores. It is possible to use a porous body having a high fuel permeability as a filter in order to remove the fine particles of, for example, a dye used as a coloring material constituting a discriminating agent. The filter noted above includes, for example, a filter paper, a carbon porous body subjected to a hydrophilic treatment, and a membrane having fine pores, though the filter is not limited thereto.

Fifth Embodiment

A liquid fuel according to a fifth embodiment of the present invention will now be described. The organic fuel components contained in the liquid fuel include methanol and organic compounds derived from methanol. The organic compound derived from methanol implies, for example, formaldehyde formed by the oxidation of methanol, formic acid, and methyl formate formed by the reaction between formic acid and methanol. These organic components have little influence on the power generation properties. It is possible for the organic fuel components to be present in the form of a methanol aqueous solution and/or an aqueous solution of the organic compound derived from methanol.

The solid component formed by the evaporation drying of the liquid fuel is dissolved or dispersed in the liquid fuel within the fuel cartridge. It is difficult to remove the solid component by using a filter or an adsorbent. Incidentally, the evaporation drying noted above denotes the operation in which the solvent component contained in the liquid fuel is evaporated (by heating the liquid fuel as required) so as to permit the solid component to be precipitated.

The solid component implies an odorless white substance that is mixed with the liquid fuel so as to form inorganic and organic impurities. The solid component does not include substances that are mixed intentionally, e.g., a coloring agent and a deodorant, and the substances seriously affect the membrane electrode assembly (MEA). Since the liquid fuel is supplied directly into the MEA, it is undesirable for the substances to be mixed with the liquid fuel such as methanol.

The concentration of the solid component should be 0.01 to 30 $\mu$g/cc of the liquid fuel. It is important for the concentration of the solid component to be not lower than 0.01 $\mu$g/cc of the liquid fuel. It should be noted that the solid component includes an inorganic component and a nonvolatile organic substance excluding methanol and the substance generated from oxidation of methanol. Incidentally, the inorganic component noted above denotes a compound such as an oxide, a hydroxide or a carbonate having a metal ion involved therein. Also, the substance derived from methanol or the oxidized substance of methanol includes, for example, formaldehyde, formic acid and methyl formate. These inorganic components and the nonvolatile organic components are mixed in the liquid fuel during the manufacture, transportation and storage of the liquid fuel component, during supply of the liquid fuel into the fuel cartridge, or during storage of the liquid fuel within the fuel cartridge. For example, if the liquid fuel is stored in a metal container, the metal ions are eluted into the liquid fuel. When it comes to the container made of a polymer material, the substances used in the manufacturing process of the polymer material such as the catalyst, the plasticizer, the antioxidant, the ultraviolet light absorber and a filler are eluted from the container into the liquid fuel housed in the container. The catalyst contains an inorganic substance. It is possible for such an inorganic catalyst to provide a metal ion source. The storing state of the liquid fuel within the fuel cartridge may affect the elution amount of the metal ions.

In order to prevent the elution of the solid component from the cartridge, it is conceivable to remove in advance the substance, which may be eluted, by processing the polymer material with an acid. However, if the eluting component is removed completely, it is possible for the mechanical strength of the fuel cartridge to be lowered so as to bring about leakage of the liquid fuel, though the amount of the solid component is made smaller than 0.01 µg/cc. It follows that, in order to maintain the hermetic sealing properties to some extent so as not to cause the liquid fuel leakage in terms of the safety, it is desirable to lower the removing rate of the eluting component that is achieved by the treatment with an acid or to cover at least that portion of the fuel cartridge which is in contact with the liquid fuel with a layer of a filler having a prescribed level or more so as to allow the amount of the solid component to be not smaller than 0.01 µg/cc.

The solid component is required for preventing the leakage of the liquid fuel from the fuel cartridge so as to improve the stability of the power generation for a long time. However, if the solid component is mixed in the MEA, the inorganic component of the solid component is accumulated in the electrolyte membrane formed of an ion exchange resin and in the proton conductive portion within the electrode so as to impair the proton conductivity. Also, if the nonvolatile organic material is supplied to the MEA, it is possible to impair the oxidizing reaction of methanol that is carried out on the anode catalyst of the MEA so as to denature the catalyst structure. Further, the filler floats within the fuel cartridge and within the stack. Therefore, if the filler enters the fuel cell in an excessively large amount, it is possible for the filler to be deposited in the fuel passageway within the stack so as to clog the fuel passageway.

It is possible to suppress the lowering of the output characteristics in the power generating operation over a long time by preventing the concentration of the solid component in the liquid fuel rising above 30 µg/cc. It is more desirable for the concentration of the solid component in the liquid fuel to fall within a range of 0.01 to 10 µg/cc, more desirably, 0.01 to 5 µg/cc.

It is desirable for the concentration of the water-insoluble component contained in the solid component to fall within a range of 0.01 to 20 µg/cc. The water-insoluble component denotes the component that is obtained by washing the solid component with water so as to remove the water soluble component, followed by drying the solid component after the washing with water.

The water-insoluble component, which is formed of an inorganic material or a nonvolatile organic material, includes, for example, substances that are insoluble in water. The power generation stability over a long time can be further improved by setting the concentration of the water-insoluble component to fall within a range of 0.01 to 20 µg/cc, more preferably 0.01 to 1.0 µg/cc, and further preferably, 0.01 to 0.1 µg/cc.

The substance, which is soluble in water and contained in the solid component, includes an inorganic material. Since the inorganic material included in the solid component is accumulated in the electrolyte membrane within the MEA so as to impair the proton conductivity, it is desirable for the inorganic material not to be contained in the liquid fuel. It is desirable for the concentration of the inorganic material to be not higher than 10 µg/cc, preferably, not higher than 5 µg/cc, and more preferably, not higher than 1 µg/cc.

During the manufacturing process of methanol, it is possible for the volatile organic materials such as ethanol and acetone to be mixed in the manufactured methanol. In order to improve the power generation stability of the fuel cell over a long time, it is desirable for the concentration of the organic components within the liquid fuel to be not higher than 20 ppm. The organic component noted above excludes methanol and the organic compound derived from methanol and includes volatile substances consisting of organic compounds having a low boiling point, such as acetone and ethanol, and a nonvolatile organic compound formed of compound having a high boiling point. It is desirable for the concentration of the organic component to be not higher than 10 ppm, more desirably, not higher than 5 ppm, because, if the concentration of the organic component is not higher than 5 ppm, the influence of the organic component is not exhibited even if the power generation is performed over a long time. Particularly, it is desirable to decrease the amount of the nonvolatile organic compound as much as possible because the nonvolatile organic compound impairs the oxidizing reaction carried out on the electrode.

Sixth Embodiment

The fuel cartridge according to a sixth embodiment of the present invention will now be described.

The fuel cartridge comprises a fuel container section and a liquid fuel housed in the fuel container section. It is possible for the fuel cartridge to be made detachable from the stack such that the fuel cartridge can be replaced, or to be fixed to the stack such that the fuel cartridge can replenished with the liquid fuel.

It is desirable for at least the portion of the fuel container section that is in contact with the liquid fuel to be formed of the filler layer, or to be formed of a polymer material that permits suppressing the elution of the inorganic substance and the organic substance into the liquid fuel.

It is advisable for the filler layer to be formed of a substance that does not adversely affect the MEA even if the filler layer is eluted into the liquid fuel. For example, it is advisable to use a silicon compound, e.g., silicon dioxide, titanium oxide or zirconium oxide, which does not form a stable cation ($Si^{4+}$, $Ti^{4+}$, $Zr^{4+}$) unless put under a low pH environment. In other words, it is advisable for the filler layer to be formed of a compound having a low solubility and forming hydroxide particles that float on the liquid fuel even if eluted into the liquid fuel. Of course, these substances are substantially free from adversely affecting the stability of the power generation characteristics of the MEA even if these substances are mixed as a solid component in the liquid fuel.

It is desirable to use a polymer material that permits suppressing the elution of an inorganic substance and an organic substance into the liquid fuel. The polymer material satisfying the particular requirement includes, for example, a fluorocarbon resin, and a polyethylene resin. In the case of using the particular polymer material, it is possible to suppress the elution of an inorganic substance and an organic substance into the liquid fuel.

In particular, in the case of using a fluorocarbon resin, e.g., tetrafluoro ethylene-perfluoro alkoxy ethylene copolymer (PFA), it is possible to suppress the elution of the impurities even under an environment in which the impurities tend to elute easily, such as a high temperature environment (40 to 60° C.) or a low pH environment. The polymer material used for forming the fuel container section of the fuel cartridge is not limited to the fluorocarbon resin. It is also possible to use a polymer material having a metal ion content of 1 to 10 ppm as measured by an ICP emission spectrometer, a polymer material into which the fuel component is unlikely to permeate, and a polymer material that is unlikely to elute into the liquid fuel. Tables 1, 2 and 3 show the metal content, the elution concentration, and the weight reduction (%) after the eluting test in respect of the polymer materials adapted for use for forming the fuel cartridge. The experimental data given in these Tables are based on the measurement by an ICP emission spectrometer. Incidentally, the abbreviations of the polymer materials given in Tables 1 to 3 are as follows:

PP: polypropylene;
EVOH: ethylene-vinyl alcohol copolymer resin;
PPS: polyphenylene sulfide;
PBT: polybutylene terephthalate;
EPDM: ethylene-propylene terpolymer;
PFA: tetrafluoro ethylene-perfluoro alkoxy ethylene copolymer;

TABLE 1

Metal content of polymer materials(ppm)

| Polymer materials | Al | Ca | Fe | Na | P | Zn |
|---|---|---|---|---|---|---|
| PP | 1.96 | 30.00 | <1 | <0.5 | 20.12 | <0.1 |
| EVOH | 0.51 | 90.00 | <1 | 70.00 | 40.00 | <0.1 |
| PPS | 30000.00 | 61000.00 | 450.00 | 3600.00 | 70.00 | 5.33 |
| PBT | 10000.00 | 21000.00 | 240.36 | 2000.00 | 89.57 | 3.44 |
| EPDM | 100.00 | 220.00 | 8.18 | 30.00 | <10 | 21000.00 |
| PFA | <0.3 | 0.10 | <0.3 | <0.1 | 0.00 | 0.00 |

TABLE 2

Eluting amount from polymer Materials (ppb, methanol solution, 60° C.-100 h, 1 g of sample, solvent: 200 cc)

| Polymer materials | Al | Ca | Fe | Na | P | Zn |
|---|---|---|---|---|---|---|
| PP | 8.68 | 18.88 | 44.53 | 25.00 | <12.5 | 14.40 |
| EVOH | 6.26 | 600.00 | 22.66 | 1225.00 | 532.13 | 5.02 |
| PPS | 222.50 | 475.00 | 18.54 | 35.00 | <12.5 | 4.89 |
| PBT | 215.00 | 450.00 | 38.77 | 35.00 | <12.5 | 5.06 |
| EPDM | 8.57 | 13.87 | 85.56 | 4.42 | <12.5 | 3750.00 |
| PFA | 0.08 | 0.44 | 0.15 | 0.08 | <12.5 | 0.08 |

TABLE 3

Weight reduction of polymer materials

| Polymer materials | Weight reduction (%) |
|---|---|
| PP | 0.16873 |
| EVOH | −6.12245 |
| PPS | 0 |
| PBT | 0.1548 |
| EPDM | 0.21008 |
| PFA | 0 |

As is apparent from Table 1, the polymer materials differ from each other in the metal composition. Also, the experimental data given in Tables 1 to 3 show that the amount of the eluting metal ion is not necessary dependent on the amount of the metal ion contained in the polymer material, that the weight of the polymer material is changed greatly after the eluting test, which indicates the permeability of the liquid material and the degree of elution, and that metal ions are eluted in a large amount from the polymer material containing a large amount of the metal ions.

It should be noted that Table 2 shows the relationship between the eluting rates (tendencies) of the metal ion components and the composition (Table 1) of the metal ion components contained in the polymer materials and supports that all the metal ion components are eluted into the solution, though the metal ion components contained in the polymer materials differ from each other in the eluting rate. It follows that it is possible for the absolute values (ppb) of the eluting amounts to be changed depending on the kind of solvent and on the retaining conditions.

In order to control the amount of the solid component contained in the liquid fuel, it is desirable to prevent the mixing of inorganic and organic components in the liquid fuel and to remove the mixed inorganic and organic components as much as possible during manufacture, transportation and storage of the liquid fuel, during supply of the liquid fuel into the fuel cartridge, or during storage of the liquid fuel within the fuel cartridge. Also, when the liquid fuel is stored and transported, it is desirable to store the liquid fuel in a container into which impurities are unlikely to enter. It is also desirable to prevent the liquid fuel from being retained under a high temperature environment as much as possible. It is advisable for the storage container to be formed of a material that is unlikely to absorb solvents such as water and methanol or a material manufactured without using a metal ion, etc. as a catalyst. In the case of using the materials exemplified above, it is advisable to apply a treatment with an acid to the material after the manufacture of the storing container so as to suppress the elution of the metal ion, etc. into the liquid fuel. It is also advisable for the container used for the manufacture, transportation and storage of the fuel to be formed of a material having the substances, which may possibly be eluted, removed therefrom in advance by a reflux treatment with a high temperature methanol. It should be noted, however, that, if the eluting component of the material is removed in advance, it is possible for the mechanical strength of the material to be lowered and for the material to expand due to the permeation of a substance and the wetting of the material. Therefore, it is not desirable to remove in advance the eluting component from the material in the case where it is necessary to guarantee the mechanical strength of the material to some extent. The desired materials of the storing container include, for example, the polymer materials described previously in conjunction with the fuel cartridge.

Seventh Embodiment

The fuel cell according to a seventh embodiment of the present invention comprises a fuel cartridge and a membrane electrode assembly to which is supplied a liquid fuel through the outlet port section of the fuel cartridge. It is possible to use any of the fuel cartridges according to the second, fourth and six embodiments of the present invention in the fuel cell.

Figure 2:
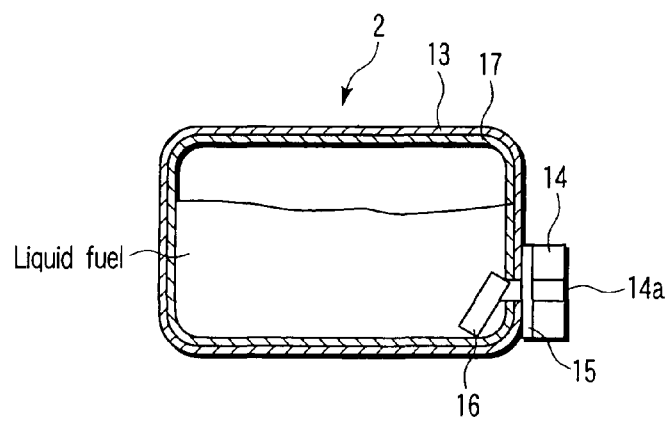
FIG. 2 is a cross sectional view schematically showing the construction of the fuel cartridge included in the fuel cell shown in FIG. 1.

FIGS. 1 to 3 show the constructions of the fuel cells according to the seventh embodiment of the present invention. Specifically, FIG. 1 shows the construction of an active type liquid fuel cell according to the seventh embodiment of the present invention. FIG. 2 is a cross sectional view schematically showing the construction of the fuel cartridge included in the fuel cell shown in FIG. 1. Further, FIG. 3 schematically shows the construction of a passive type liquid fuel cell according to the seventh embodiment of the present invention.

The fuel cell shown in FIG. 1 comprises a fuel cell unit 1 and a fuel cartridge 2 connected to the fuel cell unit 1. The fuel cell unit 1 includes a stack 3 comprising at least a set of membrane electrode assemblies (MEA), a liquid fuel tank 4, fuel pumps 5, 23, a concentration sensor 22, and an auxiliary machine 6. The membrane electrode assembly (MEA) includes an electrolyte membrane, a cathode formed on one surface of the electrolyte membrane, and an anode formed on the other surface of the electrolyte membrane. It is possible to use, for example, a proton conductive membrane such as a perfluoro sulfonic acid membrane as the electrolyte membrane. The anode, which is also called a fuel electrode, includes an anode catalyst layer and an anode diffusion layer. It is possible to use, for example, a Pt—Ru series catalyst as the anode catalyst. The cathode, which is also called an oxidizing agent electrode, includes a cathode catalyst layer and a cathode diffusion layer. It is possible to use a Pt series catalyst as the cathode catalyst. On the other hand, it is possible to use, for example, a carbon paper for forming the anode diffusion layer and the cathode diffusion layer.

The stack 3 further includes a separator having a fuel passageway arranged on the anode side of the MEA and another separator having an oxidizing agent passageway arranged on the cathode side of the MEA. A liquid fuel supply passageway 7 and a liquid fuel discharge passageway 8 are arranged between the liquid fuel tank 4 and the stack 3. The liquid fuel is supplied to the anode of the stack 3 through the liquid fuel supply passageway 7, and the liquid fuel discharged from the anode of the stack 3 is recovered in the liquid fuel tank 4 through the liquid fuel discharge passageway 8. The auxiliary machine 6 includes an air pump (not shown) for supplying air to the cathode of the MEA and a condenser (cooling device) for cooling the air discharged from the cathode and the exhaust gas of the anode. An air supply passageway 10 and an air discharge passageway 11 are arranged between the auxiliary machine 6 and the stack 3. Also, a condensed water recovery passageway 9 and a $CO_2$ exhaust gas passageway 12 are arranged between the liquid fuel tank 4 and the auxiliary machine 6. The air blown from the air pump is supplied to the cathode of the stack 3 through the air supply passageway 10, and the air discharged from the cathode is brought back to the condenser through the air discharge passageway 11. The air discharged from the cathode is cooled by the condenser so as to condense the water contained in the discharged air and the condensed water is recovered in the liquid fuel tank 4 through the condensed water recovery passageway 9. On the other hand, the gaseous component is discharged to the outside through an exhaust gas pipe 24. Also, the exhaust gas generated from the anode is introduced into the auxiliary machine 6 through the $CO_2$ exhaust gas pipe 12 so as to be cooled in the condenser included in the auxiliary machine 6. As a result, the exhaust gas is separated into the liquid component and the gaseous component and, then, $CO_2$ is discharged to the outside through the exhaust gas pipe 24.

As shown in FIG. 2, the liquid fuel cartridge 2 comprises a container 13, a connector 14 formed in the container 13, a filter or an adsorbent 15 arranged inside the connector 14, and a pipe 16 having one end arranged in the bottom portion of the container 13 and having the other end arranged within an outlet port section 14a of the connector 14. The pipe 16 serves to guide the liquid fuel efficiently to the outlet port section 14a when the amount of the liquid fuel within the container 13 is decreased. Also, it is possible to arrange a barrier layer 17 in that portion of the container 13 which is in contact with the liquid fuel, e.g., on the inner wall of the container 13.

The connector 14 is detachably connected to the liquid fuel tank 4 via the fuel pump 5. Therefore, the liquid fuel cartridge 2 can be replaced. Also, where the connector 14 is not detachable so as to make it difficult to replace the liquid fuel cartridge 2, it is advisable to form a supply port in the container 13 so as to supply the liquid fuel from the supply port into the container 13.

The passive type liquid fuel cell shown in FIG. 3 is similar in construction to the active type liquid fuel cell shown in FIGS. 1 and 2 except that fuel cell shown in FIG. 3 differs from the fuel cell shown in FIGS. 1 and 2 in the method of supplying the fuel to the anode.

As shown in FIG. 3, planar stacks 18 including membrane electrode assemblies (MEA) that are connected in parallel are arranged on both sides of a liquid fuel tank 19. Layers 20 for controlling the supply amount of the liquid fuel are arranged between the planar stacks 18 and the liquid fuel tank 19. It is possible for the control layer 20 to be formed of a diffusion control membrane of a liquid material or a gas-liquid separating membrane that permits the gaseous component to permeate therethrough selectively.

A detachable connector 14 of the liquid fuel cartridge 2 is connected to the liquid fuel tank 19 via a fuel pump 21.

The present invention will now be described more in detail with reference to Examples of the present invention.

Example 1

Cationic impurities contained in 50 g of methanol having a purity of 99.6% (grade EL) were analyzed by ICP-MS (measuring apparatus of SPQ-9000 manufactured by SII Nano Technology Inc.). The total amount of Na, K, Ca, Mg, Ni, Fe, Zn and Al was found to be $4 \times 10^{-7}$ N (ion equivalents/L). Also, a pure water having a total amount of the cations of not larger than $1 \times 10^{-7}$ N (ion equivalents/L) was used. The methanol was diluted with the pure water so as to prepare a dilute methanol solution having a methanol concentration of 1 mol/L. Then, the nitrate of Na was added to the dilute solution so as to set the total amount (concentration) of the cationic impurities at $2.2 \times 10^{-6}$ N (about 50 ppb), thereby obtaining a liquid fuel for a fuel cell. The liquid fuel thus prepared was loaded in a fuel cartridge made of polyethylene, and the fuel cell was evaluated under the conditions described herein later by using a unit cell having an electrode area of 12 cm².

Examples 2 to 6 and 10 to 19

A liquid fuel for a fuel cell was obtained as in Example 1, except that nitrates of metals shown in Table 4 were added in place of the sodium nitrate to the dilute methanol solution so as to set the concentration of the cationic impurities as shown in Table 4.

Examples 7 and 8

A liquid fuel for a fuel cell was prepared by adding aluminum nitrate to a 3M aqueous solution of formic acid so as to set the concentration of the cationic impurities at the values shown in Table 4.

Example 9

A liquid fuel for a fuel cell was prepared by adding aluminum nitrate to a 1M aqueous solution of 2-propanol so as to set the concentration of the cationic impurities at the value shown in Table 4.

Example 20

A liquid fuel for a fuel cell was prepared as in Example 1, except that an ammonium nitrate was added in place of the sodium nitrate to the dilute methanol solution so as to set the concentration of the cationic impurities in the methanol solution at the value shown in Table 4.

Comparative Examples 1 to 7

A liquid fuel for a fuel cell was prepared as in Example 1, except that the kinds and the concentrations of the cationic impurities were set as shown in Table 5.

Comparative Examples 8 and 9

A liquid fuel for a fuel cell was prepared as in Example 7, except that the kinds and the concentrations of the cationic impurities were set as shown in Table 5.

Comparative Example 10

A liquid fuel for a fuel cell was prepared as in Example 9, except that the kinds and the concentrations of the cationic impurities were set as shown in Table 5.

Comparative Example 11

A liquid fuel for a fuel cell was prepared as in Example 1, except that the cation species were not added to the dilute methanol solution.

Example 21

Figure 4:
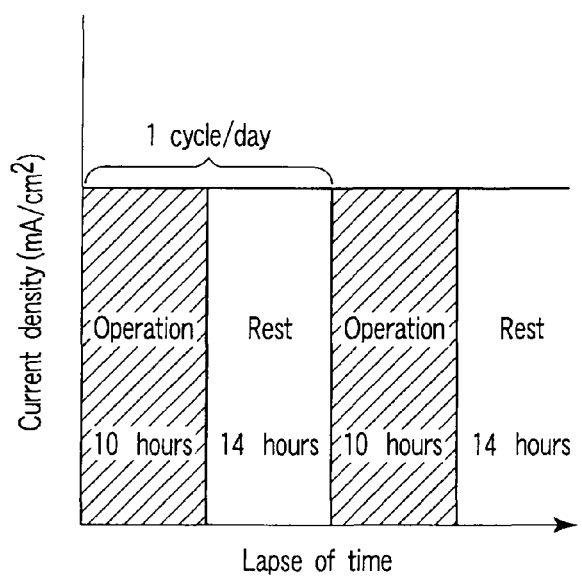
FIG. 4 schematically explains the fuel cell power generation test conducted in the Example.

Evaluation of the Cell Performance Degradation Caused by Cationic Impurities In the MEA used, a carbon paper was used as the gas diffusion layer (GDL). The loading amount of platinum on the cathode was set at 2.0 mg/cm$^2$, and the loading amount of the catalyst on the anode was set at 3.8 mg/cm$^2$. The fluid passageway of the unit cell was of the Serpentine type. The electrode area was set at 12 cm$^2$. The fuel cell was operated at 70° C. under the air flow rate of 120 mL/min and the fuel flow rate of 0.8 mL/min. The change with time in the cell voltage was measured under the current density of 150 mA/cm$^2$. The experimental data are shown in Tables 4 and 5 as the degradation rate. The degradation rate was defined as A/B, where A denotes the cell voltage 500 hours later, and B denotes the initial cell voltage. As shown in FIG. 4, the fuel cell was intermittently operated such that the operating time was continued for 10 hours, followed by stopping the operation and allowing the fuel cell to rest for 14 hours. The lapse of time is represented by the accumulation of the operating time.

TABLE 4

| | Kind of fuel | Main cation species | Normality concentration ($10^{-6}$ eq/L) | Degradation rate 500 hours later (%) |
|---|---|---|---|---|
| Example 1 | 1M CH$_3$OH aqueous solution | Na$^+$ | 2.2(50 ppb) | 4.1 |
| Example 2 | 1M CH$_3$OH aqueous solution | Al$^{3+}$ | 2.8(25 ppb) | 4.4 |
| Example 3 | 1M CH$_3$OH aqueous solution | Fe$^{2+}$ | 1.8(50 ppb) | 4.1 |
| Example 4 | 1M CH$_3$OH aqueous solution | Na$^+$ | 4.4(100 ppb) | 4.6 |
| Example 5 | 1M CH$_3$OH aqueous solution | Ca$^{2+}$ | 5.0(100 ppb) | 5.3 |
| Example 6 | 1M CH$_3$OH aqueous solution | Ni$^{2+}$ | 2.4(70 ppb) | 4.3 |
| Example 7 | 3M HCOOH aqueous solution | Al$^{3+}$ | 5.6(50 ppb) | 5.3 |
| Example 8 | 3M HCOOH aqueous solution | Al$^{3+}$ | 3.3(30 ppb) | 4.8 |
| Example 9 | 1M 2-propanol aqueous solution | Al$^{3+}$ | 3.3(30 ppb) | 4.9 |
| Example 10 | 1M CH$_3$OH aqueous solution | K$^+$ | 2.6(100 ppb) | 4.2 |
| Example 11 | 1M CH$_3$OH aqueous solution | Cr$^{3+}$ | 4.1(70 ppb) | 5.1 |
| Example 12 | 1M CH$_3$OH aqueous Solution | Mn$^{2+}$ | 3.6(100 ppb) | 4.8 |
| Example 13 | 1M CH$_3$OH aqueous Solution | Cu$^{2+}$ | 3.2(100 ppb) | 4.7 |
| Example 14 | 1M CH$_3$OH aqueous Solution | Zn$^{2+}$ | 3.1(100 ppb) | 4.6 |
| Example 15 | 1M CH$_3$OH aqueous Solution | Co$^{2+}$ | 2.4(70 ppb) | 4.3 |
| Example 16 | 1M CH$_3$OH aqueous Solution | Mg$^{2+}$ | 4.2(50 ppb) | 4.9 |
| Example 17 | 1M CH$_3$OH aqueous Solution | Sn$^{2+}$ | 2.5(150 ppb) | 4.4 |
| Example 18 | 1M CH$_3$OH aqueous Solution | Pb$^{2+}$ | 0.40(62.5 ppb) | 4.1 |
| Example 19 | 1M CH$_3$OH aqueous Solution | Fe$^{3+}$ | 3.8(70 ppb) | 4.9 |
| Example 20 | 1M CH$_3$OH aqueous Solution | NH$_4^+$ | 4.7(80 ppb) | 4.8 |

TABLE 5

| | Kind of fuel | Main cation species | Normality concentration ($10^{-6}$ eq/L) | Degradation rate 500 hours later (%) |
|---|---|---|---|---|
| Comparative Example 1 | 1M CH$_3$OH aqueous solution | Na$^+$ | 6.5(150 ppb) | 9 |
| Comparative Example 2 | 1M CH$_3$OH aqueous solution | Al$^{3+}$ | 11.1(100 ppb) | 28 |
| Comparative Example 3 | 1M CH$_3$OH aqueous solution | Fe$^{2+}$ | 7.1(200 ppb) | 23 |
| Comparative Example 4 | 1M CH$_3$OH aqueous solution | Ni$^{2+}$ | 6.8(200 ppb) | 19 |
| Comparative Example 5 | 1M CH$_3$OH aqueous solution | Ca$^{2+}$ | 10(200 ppb) | 22 |
| Comparative Example 6 | 1M CH$_3$OH aqueous solution | K$^+$ | 7.7(300 ppb) | 20 |

TABLE 5-continued

| | Kind of fuel | Main cation species | Normality concentration ($10^{-6}$ eq/L) | Degradation rate 500 hours later (%) |
|---|---|---|---|---|
| Comparative Example 7 | 1M $CH_3OH$ aqueous solution | $Zn^{2+}$ | 7.6(250 ppb) | 21 |
| Comparative Example 8 | 3M HCOOH aqueous solution | $Na^+$ | 8.6(250 ppb) | 12 |
| Comparative Example 9 | 3M HCOOH aqueous solution | $Al^{3+}$ | 11.1(100 ppb) | 25 |
| Comparative Example 10 | 1M 2-propanol aqueous solution | $Al^{3+}$ | 11.1(100 ppb) | 29 |
| Comparative Example 11 | 1M $CH_3OH$ aqueous solution | no additive | <0.1 | 4 |

Figure 5:
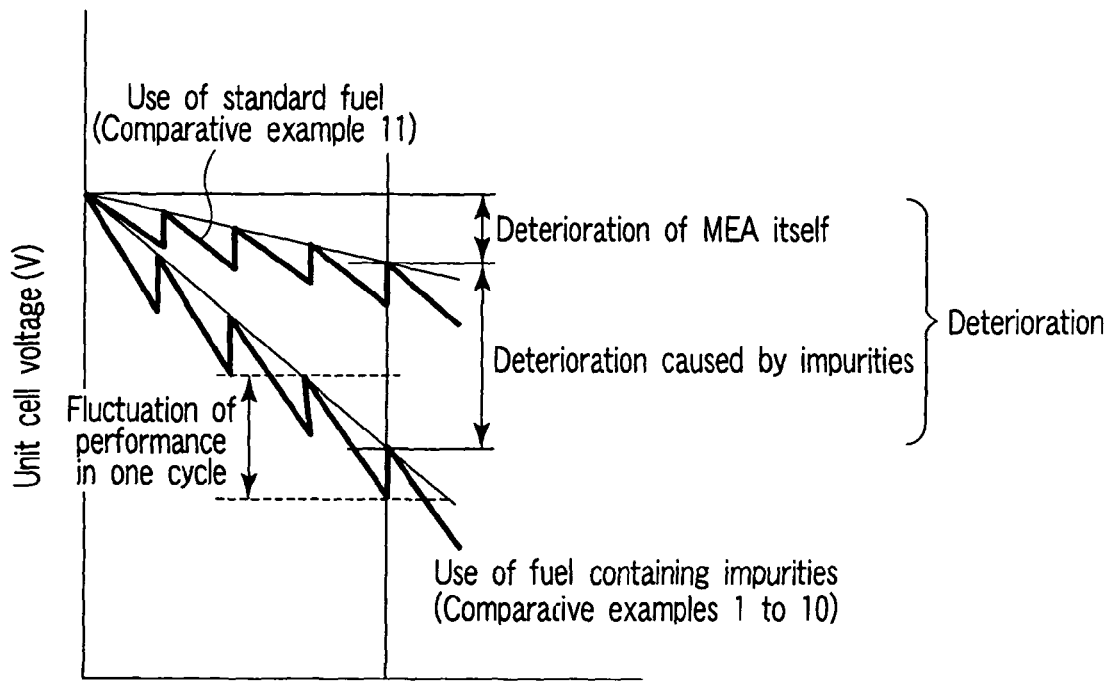
FIG. 5 schematically explains the cause of the degradation in the performance of the fuel cell for each of Comparative Examples 1 to 11.

The experimental data given in Tables 4 and 5 will now be explained with reference to FIG. 5. As shown in FIG. 5, in the case of using the standard fuel (Comparative Example 11), the degradation rate of the cell performance over a long time, which was caused by the degradation of the MEA itself such as the degradation of the catalyst, was 4%. In the fuel cells of Comparative Examples 1 to 10, in which the concentration of the cationic impurities exceeded $6 \times 10^{-6}$ equivalent/L, the degradation rate of the cell performance over a long time was increased to 9 to 29% because the degradation of the cell performance caused by the cationic impurities, which was prominently generated, was added to the degradation of the cell performance caused by the degradation of the MEA itself.

On the other hand, in the fuel cells for Examples 1 to 20, in which the concentration of the cationic impurities fell within a range of $1 \times 10^{-7}$ equivalent/L to $6 \times 10^{-6}$ equivalent/L, the degradation rate of the cell performance over a long time was found to be substantially equal to that for Comparative Example 11 in which was used the standard fuel. Particularly, the degradation rate for Examples 1, 2, 3, 6, 10, 15, 17 and 18, in which the concentration of the cationic impurities fell within a range of $4 \times 10^{-7}$ equivalent/L to $3 \times 10^{-6}$ equivalent/L, the degradation rate was prominently low.

Example 22

Nafion 117 (electrolyte membrane) available on the market was boiled for one hour within a pure water, followed by further boiling the electrolyte membrane for one hour within a 3% hydrogen peroxide solution and subsequently boiling the membrane for one hour within a 1M sulfuric acid and further boiling the membrane for one hour within a pure water. Then, the boiled electrolyte membrane was washed with a pure water until the membrane exhibited a neutral pH value. Further, the electrolyte membrane (Nafion 117) was stored in a pure water. The effects of the cation on the pre-treated Nafion 117 were examined.

Specifically, prepared were an aqueous solution containing $2.8 \times 10^{-6}$ N of $Al^{3+}$ and another aqueous solution containing $11.1 \times 10^{-6}$ N of $Al^{3+}$, followed by dipping the pretreated Nafion 117 in each of these aqueous solutions for 4 hours and subsequently washing the membranes with a pure water. The methanol permeability and the resistance of these electrolyte membranes were measured as follows.

Figure 6:
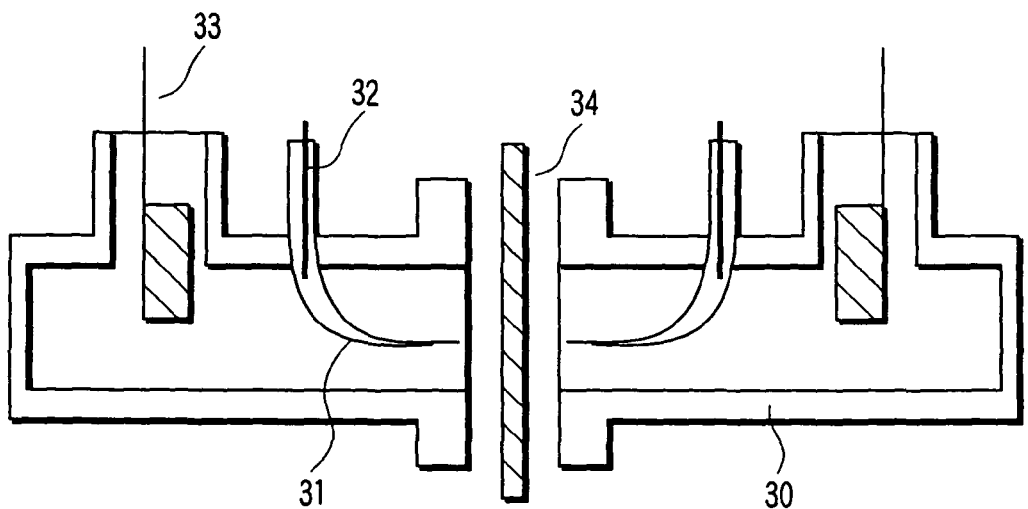
FIG. 6 schematically shows the construction of the resistance-measuring apparatus used in the membrane resistance measuring test conducted in the Example.

The membrane resistance was measured by the DC method by using a measuring cell shown in FIG. 6. As shown in the drawing, a standard electrode (SCE) 32 inserted into a Luggin fine tube 31 and a Pt electrode 33 were dipped in the liquid electrolyte (1M aqueous solution of sulfuric acid) housed in a glass cell 30. Also, the Nafion 117 membrane used as a sample 34 was arranged between the Luggin fine tubes 31. ABC 15-7DM manufactured by Toyo Technica Inc. was used as the power source, and CDM-2000D was used as a digital multi-meter. The membrane resistance was measured under the air atmosphere of room temperature and under the voltage application of 15 V and the current of 1 A.

Figure 7:
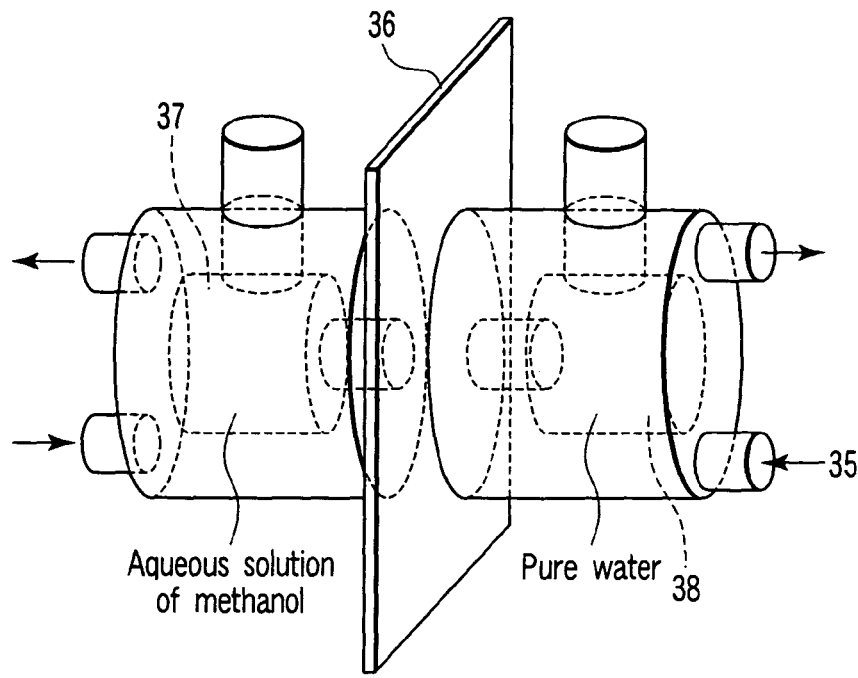
FIG. 7 schematically shows the construction of the measuring apparatus used in the methanol cross-over test conducted in the Example.

The methanol permeability was measured by using the apparatus shown in FIG. 7. During the measurement, a constant temperature water 35 set at 25° C. was circulated through the apparatus. The Nafion 117 membrane used as a sample 36 was interposed between a methanol aqueous solution vessel 37 and a pure water vessel 38. These vessels 37 and 38 were loaded with a 3M methanol aqueous solution and a pure water, respectively, and 1 μL of the solution was taken from the pure water vessel 38 every four minutes so as to measure the methanol concentration. The methanol concentration was measured by using a gas chromatography GC-14A manufactured by Shimazu Seisakusho K.K.

Table 6 shows the result of the measurement standardized by the value of Nafion 117 using pure water.

TABLE 6

| Impregnating solution | Methanol permeability | Membrane resistance |
|---|---|---|
| Pure water | 1.0 | 1.0 |
| $Al^{3+}$ concentration of $2.8 \times 10^{-6}$ N | 0.91 | 1.03 |
| $Al^{3+}$ concentration of $11.1 \times 10^{-6}$ N | 0.81 | 1.21 |

As is apparent from the experimental data given in Table 6, in the $Al^{3+}$ concentration of $2.8 \times 10^{-6}$ N, the methanol permeability was suppressed to a low level, compared with the use of a pure water, though the membrane resistance remained substantially constant. It has also been clarified that, in the $Al^{3+}$ concentration of $11.1 \times 10^{-6}$ N, the membrane resistance was increased, though the methanol permeability was further lowered.

After the degradation experiment conducted in Example 21, a material balance was measured in respect of the fuel for Example 2 in which the concentration of the cationic impurities was $2.8 \times 10^{-6}$ N, and the fuels for Example 18 in which the concentration of the cationic impurities was $0.4 \times 10^{-6}$ N, for Example 18-1 in which the concentration of the cationic impurities was $1 \times 10^{-7}$ N, for Comparative Example 2 in which the concentration of the cationic impurities was $11.1 \times 10^{-6}$ N, and for Comparative Example 11 in which the concentration of the cationic impurities was lower than $1 \times 10^{-7}$ N. Then, the methanol cross-over rate (%) was calculated by the formula N/M×100, where N denotes the amount of methanol obtained from the amount of the electricity used, and M denotes the amount of methanol used. Table 7 shows the experimental data.

TABLE 7

|  | Fuel component | Concentration of cationic impurities | Methanol cross-over rate (%) |
|---|---|---|---|
| Comparative Example 11 | 1M CH$_3$OH aqueous solution | <1.0 × 10$^{-7}$N | 28 |
| Example 18-1 | 1M CH$_3$OH aqueous solution | 1.0 × 10$^{-7}$N | 26 |
| Example 18 | 1M CH$_3$OH aqueous solution | 4.0 × 10$^{-7}$N | 25 |
| Example 2 | 1M CH$_3$OH aqueous solution | 2.8 × 10$^{-6}$N | 24 |
| Comparative Example 2 | 1M CH$_3$OH aqueous solution | 11.1 × 10$^{-6}$N | 21 |

As is apparent from Table 7, it was possible to lower the methanol cross-over rate for the fuels for Example 18-1 in which the concentration of the cationic impurities was set at $1\times10^{-7}$ N, for Example 2 in which the concentration of the cationic impurities was set at $2.8\times10^{-6}$ N, for Example 18 in which the concentration of the cationic impurities was set at $0.4\times10^{-6}$ N, and for Comparative Example 2 in which the concentration of the cationic impurities was set at $11.1\times10^{-6}$ N, compared with the methanol cross-over rate the fuel for Comparative Example 11 in which the concentration of the cationic impurities was set lower than at $1\times10^{-7}$ N.

As pointed out above, the experimental data clearly support that, if the concentration of the cationic impurities is controlled to fall within a range of $1\times10^{-7}$ equivalents/L to $6\times10^{-6}$ equivalents/L, it is possible to suppress the degradation of the cell performance over a long time and to suppress the methanol cross-over.

Example 23

One gram of a cation exchange resin having a cation exchange capacity of about 5 meq/g was arranged within a container, having an inner volume of 100 mL, of a fuel cartridge, and a 5% methanol aqueous solution having $100\times10^{-6}$ N of a cationic impurity (Al$^{3+}$) was put in the container and left to stand for several hours. When the methanol aqueous solution was discharged through the outlet port section of the connector, the concentration of the cationic impurities in the liquid fuel was found to be $5\times10^{-6}$ N. The power generation performance over a long time was evaluated as in Example 5 by using the fuel for Example 23. The power generation performance was found to be substantially equal to that for Example 5.

Comparative Example 12

The change in concentration of the cationic impurities was measured substantially as in Example 23, except that a cation exchange resin was not arranged within the container of the fuel cartridge. No change was observed in the concentration of the cationic impurities.

Example 24

A SiO$_x$ protective layer was formed by a CVD method to a thickness of 100 nm on the inner surface of the container of the fuel cartridge made of polyethylene. Methanol (grade EL) was put in the fuel cartridge, and the methanol was stored for one week at the temperature of 40° C. under the state that the fuel cartridge was kept closed, followed by measuring the amount of the metal cation by ICP-MS, with the result that the total amount of the metal cations was scarcely increased. Also, the weight reduction during storage of methanol was measured. The weight reduction was found to be 0.2%.

Example 25

An aluminum film having a thickness of 500 nm was formed by a sputtering method on the outer surface of the container of the fuel cartridge made of polyethylene. The fuel cartridge was stored for one week at the temperature of 40° C. under the state that the fuel cartridge was kept closed. Also, the change in weight during storage of the fuel cartridge was measured. The change in weight was found to be about 0.1%.

Comparative Example 13

Methanol (grade EL) was put in a fuel cartridge made of polyethylene and the weight of the cartridge housing the methanol was measured. After the methanol was stored for one week at the temperature of 40° C. under the state that the fuel cartridge was kept closed, the amount of the metal cations was measured by ICP-MS, with the result that the total amount of the metal cations was found to be $9\times10^{-6}$ N and, thus, increased, compared with the level before the storage. Also, the change in weight during storage of methanol was measured. The change in weight was found to be about 0.5%.

As pointed out above in detail, the embodiments of the present invention provides a fuel cartridge for a fuel cell in which is specified the concentration of the cationic impurities contained in the liquid fuel supplied to the liquid fuel cell so as to make it possible to suppress markedly the degradation of the fuel cell and to use the fuel cell for a long time. Naturally, the embodiments of the present invention are of high industrial value.

Example 26

The concentration of the organic impurities contained in 50 g of a 99.6% methanol, which was measured by a measuring apparatus GC-MS 5973 manufactured by Ajident Inc., was found to be not higher than 0.1 ppm. On the other hand, used was a pure water having an organic impurities concentration of not higher than 0.1 ppm. The methanol was diluted with pure water so as to prepare a dilute methanol solution having a methanol concentration of 1 mol/L. Then, ethanol (EtOH) was added to the dilute methanol solution such that the concentration of the organic impurities in the resultant solution was set at the value given in Table 8 so as to obtain sample 1 of a liquid fuel for a fuel cell. The liquid fuel thus obtained was loaded in a fuel cartridge made of PFA, and the fuel cell was evaluated under the conditions described herein later by using a unit cell having an electrode area of 12 cm$^2$.

The organic impurities added in samples 2 to 18 and Comparative Examples 14 to 20 were acetaldehyde (CH$_3$CHO), acetic acid (CH$_3$COOH), 1-propanol (1-PrOH), 2-propanol (2-PrOH), acetone {(CH$_3$)$_2$CO}, ammonia (NH$_3$), cyclohexanone (cyclo-C$_6$H$_{10}$O), dibutyl phthalate (DBP), triethoxy phosphine oxide (TEP), triphenoxy phosphine (TP-1), triphenoxy phosphine oxide (TPP), a plasticizer RS107 (manufactured by Asahi Denka Kogyo K.K.), Adecastab AQ-30 (antioxidant manufactured by Asahi Denka Kogyo K.K.), Noclack 400 (antioxidant manufactured by Ouchi Shinko Kagaku Kogyo K.K.), Noclack 300 (antioxidant manufactured by Ouchi Shinko Kagaku Kogyo K.K.), Sumisoap 200 (ultraviolet light absorber manufactured by Sumitomi Chemical Co., Ltd.), and Sumisoap 400 (ultraviolet light absorber manufactured by Sumitomi Chemical Co., Ltd.). The total amount of the organic impurities contained in the liquid fuel is shown in Tables 8 and 9.

Example 27

Evaluation of the Cell Performance Degradation Caused by Organic Impurities

In the MEA used, a carbon paper was used as the gas diffusion layer (GDL). The loading amount of the platinum catalyst on the cathode was set at 2.0 mg/cm$^2$, and the loading amount of the catalyst on the anode was set at 3.8 mg/cm$^2$. The fluid passageway of the unit cell was of the Serpentine type. The electrode area was set at 12 cm$^2$. The fuel cell was operated at 70° C. under the air flow rate of 120 mL/min and the fuel flow rate of 0.8 mL/min. The change with time in the cell voltage was measured under the current density of 150 mA/cm$^2$. The experimental data are shown in Tables 8 and 9 as the degradation rate. The degradation rate was defined as A/B, where A denotes the cell voltage 500 hours later, and B denotes the initial cell voltage. As shown in FIG. 4, the fuel cell was intermittently operated such that the operating time was continued for 10 hours, followed by stopping the operation and allowing the fuel cell to rest for 14 hours. The lapse of time is represented by the accumulation of the operating time.

TABLE 8

| | Kind of fuel | Main organic impurities | Concentration of organic impurities (ppm) | Degradation rate 500 hours later (%) |
|---|---|---|---|---|
| Sample 1 | 1M CH$_3$OH aqueous solution | C$_2$H$_5$OH | 20 | 5.9 |
| Sample 2 | 1M CH$_3$OH aqueous solution | CH$_3$COOH | 15 | 5.4 |
| Sample 3 | 1M CH$_3$OH aqueous solution | CH$_3$CHO | 15 | 5.7 |
| Sample 4 | 1M CH$_3$OH aqueous solution | 1-PrOH | 2 | 4.5 |
| Sample 5 | 1M CH$_3$OH aqueous solution | 2-PrOH | 15 | 5.0 |
| Sample 6 | 1M CH$_3$OH aqueous solution | (CH3)$_2$CO | 10 | 4.4 |
| Sample 7 | 1M CH$_3$OH aqueous solution | NH$_3$ | 10 | 4.2 |
| Sample 8 | 1M HCOOH aqueous solution | Cyclo-C$_6$H$_{10}$O | 1 | 4.5 |
| Sample 9 | 1M CH$_3$OH aqueous solution | DBP | 10 | 4.3 |
| Sample 10 | 1M CH$_3$OH aqueous solution | TEP | 10 | 4.4 |
| Sample 11 | 1M CH$_3$OH aqueous solution | TP-I | 5 | 4.6 |
| Sample 12 | 1M CH$_3$OH aqueous solution | TPP | 10 | 4.2 |
| Sample 13 | 1M CH$_3$OH aqueous solution | RS107 | 10 | 4.3 |
| Sample 14 | 1M CH$_3$OH aqueous solution | Adecastab AQ-30 | 10 | 4.4 |
| Sample 15 | 1M CH$_3$OH aqueous solution | Noclack 400 | 10 | 4.3 |
| Sample 16 | 1M CH$_3$OH aqueous solution | Noclack 300 | 10 | 4.2 |
| Sample 17 | 1M CH$_3$OH aqueous solution | Sumisoap 200 | 0.5 | 4.2 |
| Sample 18 | 1M CH$_3$OH aqueous solution | Sumisoap 400 | 10 | 4.2 |

TABLE 9

| | Kind of fuel | Main organic impurities | Concentration of organic impurities (ppm) | Degradation rate 500 hours later (%) |
|---|---|---|---|---|
| Comparative Example 14 | 1M CH$_3$OH aqueous solution | CH$_3$CHO | 30 | 10 |
| Comparative Example 15 | 1M CH$_3$OH aqueous solution | 1-PrOH | 50 | 15 |
| Comparative Example 16 | 1M CH$_3$OH aqueous solution | DBP | 100 | 12 |
| Comparative Example 17 | 1M CH$_3$OH aqueous solution | TP-I | 50 | 20 |
| Comparative Example 18 | 1M CH$_3$OH aqueous solution | RS107 | 100 | 10 |
| Comparative Example 19 | 1M CH$_3$OH aqueous solution | Adecastab AQ-30 | 100 | 13 |
| Comparative Example 20 | 1M CH$_3$OH aqueous solution | No addition | <0.1 | 4.1 |

Figure 8:
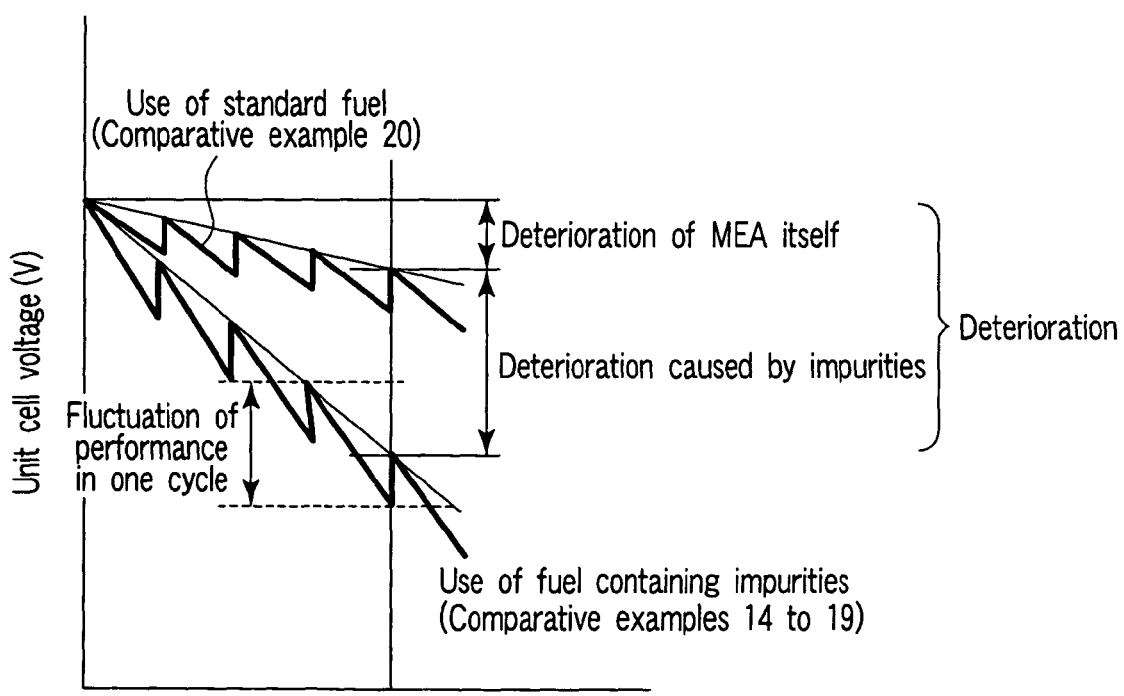
FIG. 8 schematically explains the cause of the degradation in the performance of the fuel cell for each of Comparative Examples 14 to 20.

The experimental data given in Tables 8 and 9 will now be explained with reference to FIG. 8. As shown in FIG. 8, in the case of using a standard fuel in which the concentration of the organic impurities was lower than 0.1 ppm (Comparative Example 20), the cell performance over a long time was deteriorated by the degradation of the MEA itself such as the degradation of the catalyst. In this case, the degradation rate was found to be 4.1%. On the other hand, in the fuel cells for Comparative Examples 14 to 19, in which the concentration of the organic impurities exceeded 20 ppm, the degradation rate of the cell performance over a long time was increased to 10 to 20% because the MEA itself was deteriorated and, in addition, the degradation caused by the organic impurities was rendered prominent.

On the other hand, in the fuel cells for samples 1 to 18, in which the concentration of the organic impurities was 0.1 to 20 ppm, it was possible to obtain the degradation rate of the cell performance over a long time, which was substantially equal to that for Comparative Example 20 in which was used a standard fuel. Particularly, the degradation rate for each of samples 4 and 6 to 18, in which the concentration of the organic impurities was 0.5 to 10 ppm, was found to be lower than that for samples 1 to 3 and 5 in which the concentration of the organic impurities was higher than 10 ppm.

Example 28

After the degradation experiment conducted in Example 27, a material balance in the anode and the cathode was measured in respect of the fuel for sample 17 in which the concentration of the organic impurities was 0.5 ppm, and the fuels for sample 9 in which the concentration of the organic impurities was 10 ppm, for sample 19 in which the concentration of the organic impurities was 0.1 ppm, for Comparative Example 16 in which the concentration of the organic impurities was 100 ppm, and for Comparative Example 20 in which the concentration of the organic impurities was lower than 0.1 ppm. Then, the methanol cross-over rate (%) was calculated by the formula N/M×100, where N denotes the amount of methanol obtained from the amount of the electricity used, and M denotes the amount of methanol used. Table 10 shows the experimental data.

TABLE 10

|  | Fuel component | Concentration of organic impurities (ppm) | Methanol cross-over rate (%) |
| --- | --- | --- | --- |
| Comparative Example 20 | 1M $CH_3OH$ aqueous solution | <0.1 | 28 |
| Sample 19 | 1M $CH_3OH$ aqueous Solution | 0.1 | 26.5 |
| Sample 17 | 1M $CH_3OH$ aqueous solution | 0.5 | 26 |
| Sample 9 | 1M $CH_3OH$ aqueous Solution | 10 | 25 |
| Comparative Example 16 | 1M $CH_3OH$ aqueous solution | 100 | 23 |

As is apparent from the experimental data given in Table 10, it was possible to lower the methanol cross-over rate for the fuels for sample 19 in which the concentration of the organic impurities was 0.1 ppm, for sample 17 in which the concentration of the organic impurities was 0.5 ppm, for sample 9 in which the concentration of the organic impurities was 10 ppm, and for Comparative Example 16 in which the concentration of the organic impurities was 100 ppm, compared with the methanol cross-over rate for the fuel for Comparative Example 20 in which the concentration of the organic impurities was lower than 0.1 ppm.

As pointed out above, the experimental data clearly support that, if the concentration of the organic impurities is controlled to fall within a range of 0.1 to 20 ppm, it is possible to suppress the degradation of the cell performance over a long time and to suppress the methanol cross-over.

Example 29

After the inner surface of the container of a fuel cartridge made of polyethylene was subjected to a hydrophilic treatment, the inner surface of the container was coated with a silica sol dispersion by the sol-gel method, followed by drying the coating so as to form a silica ($SiO_2$) barrier layer having a thickness of 300 nm. Then, methanol (grade EL) was stored in the fuel cartridge for one week at a temperature of 40° C. under the state that the outlet port section was kept closed. Further, measured was the concentration of the organic impurities contained in the liquid fuel, which was discharged through the outlet port section. The concentration of the organic impurities was found to be 20 ppm.

Comparative Example 21

Methanol (grade EL) was put in a fuel cartridge made of polyethylene so as to measure the weight thereof. The methanol put in the cartridge was stored for one week at the temperature of 40° C. under the state that the outlet port section was kept closed. Then, measured was the concentration of the organic impurities contained in the liquid fuel that was discharged through the outlet port section. The concentration of the organic impurities was found to be 300 ppm.

The experimental data for Example 29 and Comparative Example 21 show that it is possible to control the concentration of the organic impurities at the outlet port section of the fuel cartridge to be not higher than 20 ppm by forming a barrier layer in the interfacial portion of the container of the fuel cartridge that is in contact with the liquid fuel.

Example 30

A dye dispersion (discriminating agent) was prepared by dissolving 1 g of a butyral resin used as a dispersant in 45 g of methanol, followed by adding 5 g of a blue dye of phthalocyanine to the resultant solution by using a sand mill. When the dye dispersion was added to a liquid fuel such that the dye component was contained in the liquid fuel in a concentration of 50 ppm, the liquid fuel was changed into a blue uniform solution.

On the other hand, a filter formed of a carbon porous body subjected to the hydrophilic treatment was arranged in the outlet port section within the connector of the fuel cartridge similar to that described previously in Example 26.

The fuel cartridge was loaded with a liquid fuel, and the liquid fuel discharged through the outlet port section was observed. The liquid fuel was found to be colorless, and the concentration of the organic impurities contained in the liquid fuel was found to be not higher than 20 ppm. This indicates that, in order to enable the organic additive such as the discriminating agent to produce its effect, it is necessary for the concentration of the organic additive contained in the liquid fuel to be higher than 20 ppm.

As pointed out above, the embodiments of the present invention provides a fuel cartridge for a fuel cell in which is specified the concentration of the organic impurities contained in the liquid fuel that is supplied to the liquid fuel cell.

The particular fuel cartridge permits markedly suppressing the degradation of the fuel cell so as to make it possible to use the fuel cell for a long time. It follows that the embodiments of the present invention are of high industrial value.

Example 31

A pure methanol having a purity of 99.999% (the balance being water) was loaded in a cartridge so as to prepare a fuel cartridge (100 cc) for a direct methanol fuel cell (DMFC). The portion of the fuel cartridge in direct contact with the pure methanol was formed mainly of a fluorocarbon resin of PFA. Prepared were 200 fuel cartridges. One month after the manufacture, the fuel cartridge was connected directly to a DMFC unit (15 W) and operated for one year such that the total operating time was about 2,000 hours (each fuel cell being operated for about 10 hours). The power generation characteristics of the fuel cell during operation for one year fluctuated within a range of 5 to 10%, with an average of 7% or less, which is satisfactory.

The methanol within the fuel cartridge was analyzed, with the result that the concentration of the solid component contained in the methanol was found to be not higher than 8 μg/cc of the fuel and the concentration of the organic components insoluble in water, which were contained in the fuel, was found to be not higher than 3 μg/cc of the fuel. Also, the concentration of the organic materials excluding methanol and the compounds formed by the oxidation of methanol, which were contained in the liquid fuel, was found to be 5 ppm. Incidentally, the amounts of the metal components were measured by an ICP emission spectrometer. Also, the amounts of the organic components were measured by using IR and GC/MS. The amounts of the solid components were obtained by subjecting the fuel to the evaporation drying and by measuring the weight of the dried components.

Example 32

A pure methanol was loaded in a fuel cartridge as in Example 31, and the power generation was performed for one year by using the same DMFC unit, except that PFA used in Example 31 was replaced by polycarbonate treated with an aqueous solution of an acid so as to remove the inorganic components and the organic components that can be eluted. An aqueous solution containing 1% by weight of formic acid was used as the aqueous solution for the treatment with the acid. The treatment with the acid was performed at 80° C. for 3 hours.

The power generation unit of DMFC was found to have maintained satisfactory power generation characteristics for about one year so as to perform a stable power generation within a fluctuation range of 6% or less on average.

The methanol within the fuel cartridge was analyzed such that the metal components were analyzed by an ICP emission spectrometer, the organic components were analyzed by IR and GC/MS, and the fuel was subjected to the evaporation drying so as to measure the weight of the solid components. The concentration of the solid components contained in the fuel methanol was found to be not higher than 5 μg/cc of the fuel, and the concentration of the organic components insoluble in water, which were contained in the fuel methanol was found to be not higher than 1 μg/cc of the fuel. Further, the concentration of the organic materials excluding methanol and the compounds formed by the oxidation of methanol, which were contained in the liquid fuel, was found to be 2 ppm.

Example 33

A liquid fuel was prepared by adding 0.01 μg of a surfactant to 1 cc of a 30% methanol aqueous solution obtained by using a pure methanol having a purity of 99.999% (the balance being water) and a pure water. The liquid fuel thus prepared was put in a cartridge so as to obtain a fuel cartridge (100 cc) for a DMFC. The portion of the cartridge in contact with the liquid fuel was formed of a fluorocarbon resin of PFA from which the soluble components were removed in advance by the treatment with an acid. 200 fuel cartridges were prepared as above. An aqueous solution containing 1% by weight of formic acid was used as the aqueous solution for the treatment with the acid. The treatment with the acid was performed at 80° C. for 3 hours.

One month after the manufacture, the fuel cartridge was connected directly to a DMFC unit (15 W) and operated for one year such that the total operating time was about 2,000 hours (each fuel cell being operated for about 10 hours). The power generation characteristics of the fuel cell during operation for one year fluctuated within a range of 5 to 10%, with an average of 8% or less, which was satisfactory.

The methanol within the fuel cartridge was analyzed, with the result that the concentration of the solid components contained in the fuel methanol was found to be not higher than 0.015 μg/cc of the fuel and the concentration of the organic components insoluble in water, which were contained in the fuel methanol, was found to be 0.01 μg/cc of the fuel. Also, the concentration of the organic materials excluding methanol and the compounds formed by the oxidation of methanol, which were contained in the liquid fuel, was found to be 0.5 ppm. Incidentally, the amounts of the metal components were measured by an ICP emission spectrometer. Also, the amounts of the organic components were measured by using IR and GC/MS. Further, the amounts of the solid components were obtained by subjecting the fuel to the evaporation drying and by measuring the weight of the dried components.

Example 34

The eluting components in the portion of the fuel cartridge made of polyethylene in contact with the liquid fuel were removed by the treatment with an aqueous solution of an acid, i.e., an aqueous solution containing 1% by weight of formic acid. The treatment with the acid was performed at 80° C. for 3 hours. Then, a filler layer made of $SiO_2$ was formed in the portion treated with the acid. In the next step, the fuel cartridge was loaded with a pure methanol having a purity of 99.999% (the balance being water) so as to prepare a fuel cartridge (100 cc) for DMFC. Prepared were 200 fuel cartridges. One month after the manufacture, the fuel cartridge was connected directly to a DMFC unit (15 W) and operated for one year such that the total operating time was about 2,000 hours (each fuel cell being operated for about 10 hours). The power generation characteristics of the fuel cell during operation for one year fluctuated within a range of 4 to 8%, with an average of 6% or less, which was satisfactory. Also, the cartridge was not damaged during use and, thus, was free from fuel leakage to the outside.

The methanol within the fuel cartridge was analyzed, with the result that the concentration of the solid components contained in the fuel methanol was found to be 0.015 μg/cc of the fuel and the concentration of the organic components insoluble in water, which were contained in the fuel methanol, was found to be not higher than 0.01 μg/cc of the fuel. Also, the concentration of the organic materials excluding methanol and the compounds formed by the oxidation of methanol, which were contained in the liquid fuel, was found to be 0.1 ppm. Incidentally, the amounts of the metal components were measured by an ICP emission spectrometer. Also, the amounts of the organic components were measured by using IR and GC/MS. Further, the amounts of the solid components were obtained by subjecting the fuel to the evaporation drying and by measuring the weight of the dried components.

Example 35

A fuel cartridge was loaded with a pure methanol and the power generation was performed for one year by using the same DMFC as in Example 31, except that methanol having a purity of 95%, the balance being volatile organic substances such as ethanol and acetone, was used in place the pure methanol having a purity of 99.999%.

The output of the power generation unit of DMFC was lowered by 5% or more immediately after use of the cartridge. The power generation output continued to be lowered gradually in the succeeding power generating operation, with the result that the lowering of the power generation output was increased to reach about 10 to 15% based on the initial power generation output about one year later.

The methanol within the fuel cartridge was analyzed, with the result that the concentration of the solid components contained in the fuel methanol was found to be not higher than 5 µg/cc of the fuel and the concentration of the organic components insoluble in water, which were contained in the fuel methanol, was found to be not higher than 1 µg/cc of the fuel. It has been clarified that the power generation output was lowered by the volatile organic materials such as ethanol and acetone contained in the fuel methanol loaded in the initial stage.

Incidentally, the amounts of the metal components contained in the fuel methanol were measured by an ICP emission spectrometer. Also, the amounts of the organic components contained in the fuel methanol were measured by using IR and GC/MS. Further, the amounts of the solid components contained in the fuel methanol were obtained by subjecting the fuel to the evaporation drying and by measuring the weight of the dried components.

Example 36

A fuel cartridge (100 cc) for a direct methanol fuel cell (DMFC) was prepared by loading a cartridge with a pure methanol having a purity of 99.999% (the balance being water). That portion of the fuel cartridge which was in direct contact with the pure methanol was formed mainly of an organic polysiloxane. Prepared were 200 fuel cartridges in total. One month after the manufacture, the fuel cartridge was connected directly to a DMFC unit (15 W) and operated for one year such that the total operating time was about 2,000 hours (each fuel cell being operated for about 10 hours). The power generation characteristics of the fuel cell during operation for one year fluctuated within a range of 10 to 15%, with an average of 13% or less, which was satisfactory.

The methanol within the fuel cartridge was analyzed, with the result that the concentration of the solid components contained in the fuel methanol was found to be not higher than 30 µg/cc of the fuel and the concentration of the organic components insoluble in water, which were contained in the fuel methanol, was found to be not higher than 20 µg/cc of the fuel. Also, the concentration of the organic materials excluding methanol and the compounds formed by the oxidation of methanol, which were contained in the liquid fuel, was found to be 20 ppm. Incidentally, the amounts of the metal components contained in the liquid fuel were measured by an ICP emission spectrometer. Also, the amounts of the organic components contained in the liquid fuel were measured by using IR and GC/MS. Further, the amounts of the solid components contained in the liquid fuel were obtained by subjecting the fuel to the evaporation drying and by measuring the weight of the dried components.

Example 37

A fuel cartridge (100 cc) for a direct methanol fuel cell (DMFC) was prepared by loading a cartridge with a pure methanol having a purity of 99.999% (the balance being water). The portion of the fuel cartridge in direct contact with the pure methanol was formed mainly of polypropylene. Prepared were 200 fuel cartridges in total. One month after the manufacture, the fuel cartridge was connected directly to a DMFC unit (15 W) and operated for one year such that the total operating time was about 2,000 hours (each fuel cell being operated for about 10 hours). The power generation characteristics of the fuel cell during operation for one year fluctuated within a range of 8 to 15%, with an average of 10% or less, which was satisfactory.

The methanol within the fuel cartridge was analyzed, with the result that the concentration of the solid components contained in the fuel methanol was found to be not higher than 10 µg/cc of the fuel and the concentration of the organic components insoluble in water, which were contained in the fuel methanol, was found to be not higher than 3 µg/cc of the fuel. Also, the concentration of the organic materials excluding methanol and the compounds formed by the oxidation of methanol, which were contained in the liquid fuel, was found to be 10 ppm. Incidentally, the amounts of the metal components contained in the liquid fuel were measured by an ICP emission spectrometer. Also, the amounts of the organic components contained in the liquid fuel were measured by using IR and GC/MS. Further, the amounts of the solid components contained in the liquid fuel were obtained by subjecting the fuel to the evaporation drying and by measuring the weight of the dried components.

Example 38

A fuel cartridge (100 cc) for a direct methanol fuel cell (DMFC) was prepared by loading a cartridge with a pure methanol having a purity of 99.999% (the balance being water). The portion of the fuel cartridge in direct contact with the pure methanol was formed mainly of polycarbonate. Prepared were 200 fuel cartridges in total. One month after the manufacture, the fuel cartridge was connected directly to a DMFC unit (15 W) and operated for one year such that the total operating time was about 2,000 hours (each fuel cell being operated for about 10 hours). The power generation characteristics of the fuel cell during operation for one year fluctuated within a range of 5 to 13%, with an average of 7% or less, which was satisfactory.

The methanol within the fuel cartridge was analyzed, with the result that the concentration of the solid components contained in the fuel methanol was found to be not higher than 1 µg/cc of the fuel and the concentration of the organic components insoluble in water, which were contained in the liquid fuel, was found to be not higher than 0.1 µg/cc of the fuel. Also, the concentration of the organic materials excluding methanol and the compounds formed by the oxidation of methanol, which were contained in the liquid fuel, was found to be 1 ppm. Incidentally, the amounts of the metal components contained in the liquid fuel were measured by an ICP emission spectrometer. Also, the amounts of the organic components contained in the liquid fuel were measured by using IR and GC/MS. Further, the amounts of the solid components contained in the liquid fuel were obtained by subjecting the fuel to the evaporation drying and by measuring the weight of the dried components.

Comparative Example 22

A fuel cartridge was loaded with a pure methanol and the power generation was performed for one year by using the same DMFC unit as in Example 31, except that PFA used in the fuel cartridge for Example 31 was replaced by a silicon tube.

The output of the DMFC power generating unit began to be lowered gradually in about one month (about 200 hours) such that the output of the power generating unit was lowered to reach about 15% based on the initial output in about 6 months (about 1,000 hours). In this case, the output of the power generating unit was not brought back to the initial output. The methanol within the unused fuel cartridge was analyzed, with the result that the solid components were contained in the methanol in a concentration not lower than 35 ppm (exceeding 30 µg/cc). In other words, a large amount of impurities based on inorganic compounds such as alkali metal ions and alkaline earth metal ions were eluted into methanol.

Incidentally, the amounts of the metal components contained in the liquid fuel housed in the fuel cartridge were measured by an ICP emission spectrometer. Also, the amounts of the organic components contained in the liquid fuel were measured by using IR and GC/MS. Further, the amounts of the solid components contained in the liquid fuel were obtained by subjecting the fuel to the evaporation drying and by measuring the weight of the dried components.

Comparative Example 23

A liquid fuel was obtained by adding 0.005 µg of a surfactant to 1 cc of a 30% methanol aqueous solution prepared by using a pure methanol having a purity of 99.999% (the balance being water) and a pure water. The liquid fuel thus prepared was put in a cartridge so as to obtain a fuel cartridge (100 cc) for a DMFC. The portion of the cartridge in contact with the liquid fuel was formed of a fluorocarbon resin of PFA from which the soluble components were removed in advance by the treatment with an acid. 200 fuel cartridges were prepared as above. An aqueous solution containing 1% by weight of formic acid was used as the aqueous solution for the treatment with the acid. The treatment with the acid was performed at 80° C. for 3 hours.

One month after the manufacture, the fuel cartridge was connected directly to a DMFC unit (15 W) and operated for one year such that the total operating time was about 2,000 hours (each fuel cell being operated for about 10 hours). The power generation characteristics of the fuel cell during operation for the first 3 months fluctuated within a range of 5 to 10%. Also, the output of the power generating operation began to be lowered in about 6 months, and the lowering rate of output reached 25% one year later. It has been found that the distribution of the liquid fuel within the DMFC unit was rendered nonuniform with time so as to lower the power generated.

The methanol within the fuel cartridge was analyzed, with the result that the concentration of the solid components contained in the fuel methanol was found to be 0.008 µg/cc of the fuel and the concentration of the organic components insoluble in water, which were contained in the fuel methanol, was found to be 0.005 µg/cc of the fuel. Incidentally, the amounts of the metal components contained in the liquid fuel were measured by an ICP emission spectrometer. Also, the amounts of the organic components contained in the liquid fuel were measured by using IR and GC/MS. Further, the amounts of the solid components contained in the liquid fuel were obtained by subjecting the liquid fuel to the evaporation drying and by measuring the weight of the dried components.

Comparative Example 24

A pure methanol having a purity of 99.999% (the balance being water) was put in a cartridge so as to obtain a fuel cartridge (100 cc) for a DMFC. The portion of the cartridge in contact with the liquid fuel was formed of polyethylene from which the eluting components were removed in advance by the treatment with an acid. 200 fuel cartridges were prepared as above. An aqueous solution containing 1% by weight of formic acid was used as the aqueous solution for the treatment with the acid. The treatment with the acid was performed at 80° C. for 3 hours.

One month after the manufacture, the fuel cartridge was connected directly to a DMFC unit (15 W) and operated for one year such that the total operating time was about 2,000 hours (each fuel cell being operated for about 10 hours). The power generation characteristics of the fuel cell during operation for six months fluctuated within a range of 5 to 10%, with an average of 7% or less, which was satisfactory. However, liquid leakage from within the cartridge was found in many portions six months later so as to make it difficult to perform the power generation continuously.

The methanol within the fuel cartridge was analyzed, with the result that the concentration of the solid components contained in the liquid fuel was found to be 0.008 µg/cc of the fuel and the concentration of the organic components insoluble in water, which were contained in the liquid fuel, was found to be not higher than 0.005 µg/cc of the fuel. Incidentally, the amounts of the metal components contained in the liquid fuel were measured by an ICP emission spectrometer. Also, the amounts of the organic components contained in the liquid fuel were measured by using IR and GC/MS. Further, the amounts of the solid components contained in the liquid fuel were obtained by subjecting the fuel to the evaporation drying and by measuring the weight of the dried components.

The cause of the rupture of the fuel cartridge has been examined. It has been found that the mechanical strength of the container was lowered so as to bring about the liquid leakage because an eluting treatment was applied to the polyethylene forming the container before the container was loaded with the fuel. It has been clarified that, if a preliminary eluting treatment is applied excessively to the material of the container, an inconvenience is generated in the use of the DMFC.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A fuel cartridge adapted to connect to a fuel cell comprising:
   a container having an inner wall and outlet port adapted to connect to a fuel cell;
   a protective layer provided on the inner wall and containing a polymer or a diamond-like carbon (DLC); and
   a liquid fuel provided in the container, said liquid fuel containing a cation that is not $H^+$ at a concentration falling within a range of $1 \times 10^{-7}$ to $6 \times 10^{-6}$ equivalent/L, said cation being selected from the group consisting of $Na^+$, $Al^{3+}$, $Fe^{2+}$, $Ca^{2+}$, $Ni^{2+}$, $K^+$, $Cr^{3+}$, $Mn^{2+}$, $Cu^{2+}$, $Zn^{2+}$, $Co^{2+}$, $Mg^{2+}$, $Sn^{2+}$, $Pb^{2+}$, $Fe^{3+}$ and $NH_4^+$,
   wherein said liquid fuel contains said cation at a concentration falling within a range of $1 \times 10^{-7}$ to $1 \times 10^{-6}$ equivalent/L at the outlet port.

2. The fuel cartridge according to claim 1, wherein the fuel component contains a compound having at least one functional group selected from the group consisting of a hydroxyl group and an aldehyde group.

3. The fuel cartridge according to claim 2, wherein the compound is at least one compound selected from the group consisting of methanol, ethanol, 2-propanol and formic acid.

4. The fuel cartridge according to claim 1, wherein the concentration of the cation falls within a range of $4 \times 10^{-7}$ to $3 \times 10^{-6}$ equivalent/L at the outlet port.

5. The fuel cartridge according to claim 1, further comprising a cation adsorbent in an amount sufficient to provide a liquid fuel that has a concentration of the impurity cation falling within the range $1 \times 10^{-7}$ to $6 \times 10^{-6}$ equivalent/L for release from the fuel cartridge via the outlet port.

6. A liquid fuel to be supplied into a fuel cartridge including an outlet port, the fuel cartridge being connected to a fuel cell, comprising:
   a fuel component; and
   an cation that is not $H^+$ in a concentration of $1 \times 10^{-7}$ to $6 \times 10^{-6}$ equivalent/L;
   wherein said cation that is not $H^+$ is selected from the group consisting of $Na^+$, $Al^{3+}$, $Fe^{2+}$, $Ca^{2+}$, $Ni^{2+}$, $K^+$, $Cr^{3+}$, $Mn^{2+}$, $Cu^{2+}$, $Zn^{2+}$, $Co^{2+}$, $Mg^{2+}$, $Sn^{2+}$, $Pb^{2+}$, $Fe^{3+}$ and $NH_4^+$.

7. The liquid fuel of claim 6, which contains the non-hydrogen ion cation within a range of $4 \times 10^{-7}$ to $3 \times 10^{-6}$ equivalent/L.

8. The liquid fuel of claim 6, which comprises at least one compound selected from the group consisting of methanol, ethanol, 2-propanol and formic acid.

9. The liquid fuel of claim 6, wherein said cation comprises an alkali metal cation selected from the group consisting of $Na^+$ and $K^+$.

10. The liquid fuel of claim 6, wherein said cation comprises an alkali earth metal cation selected from the group consisting of $Ca^{2+}$ and $Mg^{2+}$.

11. The liquid fuel of claim 6, wherein said cation comprises a metal cation selected from the group consisting of $Al^{3+}$, $Co^{2+}$, $Cr^{3+}$, $Cu^{2+}$, $Fe^{2+}$, $Fe^{3+}$, $Mn^{2+}$, $Ni^{2+}$, $Pb^{2+}$, $Sn^{2+}$, and $Zn^{2+}$.

12. The liquid fuel of claim 6, wherein said cation comprises $NH_4^+$.

13. The fuel cartridge of claim 1, wherein said cation comprises an alkali metal cation selected from the group consisting of $Na^+$ and $K^+$.

14. The fuel cartridge of claim 1, wherein said cation comprises an alkali earth metal cation selected from the group consisting of $Ca^{2+}$ and $Mg^{2+}$.

15. The fuel cartridge of claim 1, wherein said cation comprises a metal cation selected from the group consisting of $Al^{3+}$, $Co^{2+}$, $Cr^{3+}$, $Cu^{2+}$, $Fe^{2+}$, $Fe^{3+}$, $Mn^{2+}$, $Ni^{2+}$, $Pb^{2+}$, $Sn^{2+}$, and $Zn^{2+}$.

16. The fuel cartridge of claim 1, wherein said impurity cation comprises $NH_4^+$.

17. A fuel cartridge comprising:
   a container having an outlet port; and
   a liquid fuel that has a concentration of an cation that is not $H^+$ falling within a range of $1 \times 10^{-7}$ to $6 \times 10^{-6}$ equivalent/L.

18. A liquid fuel, comprising:
   a fuel component; and
   a cation that is not $H^+$, in a concentration of $1 \times 10^{-7}$ to $6 \times 10^{-6}$ equivalent/L.

19. A method of using a fuel cartridge adapted to connect to a fuel cell to produce electrical energy, the method comprising electrochemically oxidizing a fuel in a fuel cartridge, wherein said fuel cartridge comprises:
   a container having an inner wall and outlet port adapted to connect to a fuel cell;
   a protective layer provided on the inner wall and containing a polymer or a diamond-like carbon (DLC); and
   a liquid fuel provided in the container, said liquid fuel containing a cation that is not $H^+$ at a concentration falling within a range of $1 \times 10^{-7}$ to $6 \times 10^{-6}$ equivalent/L, said cation being selected from the group consisting of $Na^+$, $Al^{3+}$, $Fe^{2+}$, $Ca^{2+}$, $Ni^{2+}$, $K^+$, $Cr^{3+}$, $Mn^{2+}$, $Cu^{2+}$, $Zn^{2+}$, $Co^{2+}$, $Mg^{2+}$, $Sn^{2+}$, $Pb^{2+}$, $Fe^{3+}$ and $NH_4^+$, wherein said liquid fuel contains said cation at a concentration falling within a range of $1 \times 10^{-7}$ to $1 \times 10^{-6}$ equivalent/L at the outlet port.

20. The method of claim 19, wherein said fuel is methanol that contains $1 \times 10^{-7}$ to $6 \times 10^{-6}$ equivalent/L of an alkali metal cation.

21. The method of claim 19, wherein said fuel is methanol that contains $1 \times 10^{-7}$ to $6 \times 10^{-6}$ equivalent/L of an alkali metal cation that is $Na^+$.

* * * * *